United States Patent
Liu et al.

(10) Patent No.: US 11,340,645 B2
(45) Date of Patent: May 24, 2022

(54) POWER CONVERSION APPARATUS FOR TRACKING MAXIMUM POWER POINT AND CONTROL METHOD THEREOF

(71) Applicant: RICHTEK TECHNOLOGY CORPORATION, Zhubei (TW)

(72) Inventors: Kuo-Chi Liu, Hsinchu (TW); Chang-Yu Ho, Hsinchu (TW)

(73) Assignee: RICHTEK TECHNOLOGY CORPORATION, Hsinchu (TW)

( * ) Notice: Subject to any disclaimer, the term of this patent is extended or adjusted under 35 U.S.C. 154(b) by 295 days.

(21) Appl. No.: 16/730,940

(22) Filed: Dec. 30, 2019

(65) Prior Publication Data

US 2020/0285263 A1    Sep. 10, 2020

Related U.S. Application Data

(60) Provisional application No. 62/814,720, filed on Mar. 6, 2019.

(30) Foreign Application Priority Data

Jul. 23, 2019 (TW) .................................. 108125970

(51) Int. Cl.
| | | |
|---|---|---|
| *G05F 1/67* | (2006.01) | |
| *H02M 3/156* | (2006.01) | |
| *H02M 7/48* | (2007.01) | |
| *H02M 1/42* | (2007.01) | |
| *H02M 1/00* | (2006.01) | |

(52) U.S. Cl.
CPC ............. *G05F 1/67* (2013.01); *H02M 1/4258* (2013.01); *H02M 7/48* (2013.01); *H02M 1/007* (2021.05)

(58) Field of Classification Search
CPC ......... G05F 1/67; H02M 1/4258; H02M 7/48; H02M 1/007; H02M 3/156
See application file for complete search history.

(56) References Cited

U.S. PATENT DOCUMENTS

| | | | | |
|---|---|---|---|---|
| 3,566,143 A | * | 2/1971 | Paine ........................ | H02J 7/34 307/126 |
| 4,272,806 A | * | 6/1981 | Metzger ............ | H02M 3/33507 363/21.17 |
| 4,390,940 A | * | 6/1983 | Corbefin ................... | G05F 1/67 363/132 |

* cited by examiner

*Primary Examiner* — Rexford N Barnie
*Assistant Examiner* — Elim Ortiz
(74) *Attorney, Agent, or Firm* — Tung & Associates

(57) ABSTRACT

A power conversion apparatus for tracking maximum power point (MPP) includes: a signal processing circuit generating a first sensing signal at a sensing node; a first comparison circuit generating a first control signal according to a difference between the first sensing signal and a first reference voltage; and a second comparison circuit sensing a second sensing signal generated from the conversion circuit. The second comparison circuit generates a second control signal according to a difference between the second sensing signal and a reference signal. The signal processing circuit includes a bias sensing circuit and a clamp circuit. The bias sensing circuit adjusts the first sensing signal according to the second control signal, to adjust the first control signal. The conversion circuit adjusts a voltage and/or current of the output power according to the adjusted first control signal, so that a power retrieval source operates near its MPP.

26 Claims, 15 Drawing Sheets

DS { DSV (an input voltage related signal or an output voltage related signal)
DSI (an input current related signal or an output current related signal)
DSP (power related signals of power of input power or power of output power)

REF2 { VREF2
IREF
PREF

DS {
- DSV (an input voltage related signal or an output voltage related signal)
- DSI (an input current related signal or an output current related signal)
- DSP (power related signals of power of input power or power of output power)

REF2 {
- VREF2
- IREF
- PREF

DS {
  DSV (an input voltage related signal or an output voltage related signal)
  DSI (an input current related signal or an output current related signal)
  DSP (power related signals of power of input power or power of output power)
}

REF2 {
  VREF2
  IREF
  PREF
}

DS {
- DSV (an input voltage related signal or an output voltage related signal)
- DSI (an input current related signal or an output current related signal)
- DSP (power related signals of power of input power or power of output power)

REF2 {
- VREF2
- IREF
- PREF

DS {
- DSV (an input voltage related signal or an output voltage related signal)
- DSI (an input current related signal or an output current related signal)
- DSP (power related signals of power of input power or power of output power)

REF2 {
- VREF2
- IREF
- PREF

POWER CONVERSION APPARATUS FOR TRACKING MAXIMUM POWER POINT AND CONTROL METHOD THEREOF

CROSS REFERENCE

The present invention claims priority to U.S. 62/814,720, filed on Mar. 6, 2019 and TW 108125970, filed on Jul. 23, 2019.

BACKGROUND OF THE INVENTION

Field of Invention

The present invention relates to a power conversion apparatus. In particular, the present invention relates to a power conversion apparatus for tracking maximum power point. The present invention also relates to a control method for a power conversion apparatus for tracking maximum power point.

Description of Related Art

As shown in FIG. 1, U.S. Pat. No. 6,984,970 discloses a conventional power conversion apparatus (i.e., power conversion apparatus 501). The power conversion apparatus 501 senses an input voltage Vin and an input current Ic supplied from a power retrieval source 7 (e.g., a photovoltaic battery), and calculates power by a calculation circuit 29, to thereby control a converter circuit 14 to track a maximum power point of the power retrieval source 7.

The prior art shown in FIG. 1 has a drawback that: the prior art needs to sense both the input voltage Vin and the input current Ic supplied from the power retrieval source 7, and to calculate power by the calculation circuit 29, whereby the circuitry of this prior art is complicated and not cost-effective.

As shown in FIG. 2, U.S. Pat. No. 4,604,567 discloses another conventional power conversion apparatus (i.e., power conversion apparatus 502). The power conversion apparatus 502 turns OFF a power switch 23 to sample-and-hold an open-circuit voltage of a photovoltaic battery 10, thereby tracking a maximum power point of the photovoltaic battery 10.

The prior art shown in FIG. 2 has a drawback that: to track a maximum power point of the photovoltaic battery 10, the prior art needs to keep turning ON and OFF the circuit loop of the whole power conversion apparatus 502; such operation will adversely affect the operation of downstream circuits such as prolonging the charging period of a downstream storage battery 15 or impacting the operation of a downstream load circuit 12.

In view of the above, the present invention provides a power conversion apparatus for tracking maximum power point to overcome the drawbacks in the prior art. Compared to the prior arts shown in FIG. 1 and FIG. 2, the present invention has merits of simpler circuit configuration and lower cost. Compared to the prior art shown in FIG. 2, the present invention does not require turning OFF the circuit loop and can provide uninterrupted charging operation.

SUMMARY OF THE INVENTION

From one perspective, the present invention provides a power conversion apparatus for tracking maximum power point, which is configured to receive an input power supplied by a power retrieval source; the power conversion apparatus comprising: a signal processing circuit coupled to the input power, wherein the signal processing circuit is configured to operably generate a first sensing signal at a sensing node; a first comparison circuit, which is configured to operably generate a first control signal according to a difference between the first sensing signal and a first reference voltage; a converter circuit, which is configured to operably convert the input power to an output power according to the first control signal, so as to supply the output power to a load circuit; and a second comparison circuit, which is configured to operably sense a second sensing signal generated by the converter circuit, the second comparison circuit being configured to operably generate a second control signal according to a difference between the second sensing signal and a reference signal, wherein the second sensing signal includes one of the following or a combination thereof: (1) an input voltage related signal of the input power; (2) an output voltage related signal of the output power; (3) an input current related signal of the input power; (4) an output current related signal of the output power; (5) a power related signal of the input power; and/or (6) a power related signal of the output power; wherein the signal processing circuit includes: a bias sensing circuit coupled between the input power and the sensing node, wherein the bias sensing circuit is configured to operably generate the first sensing signal at the sensing node according to the input voltage; and a clamp circuit coupled to the sensing node, wherein the clamp circuit is configured to operably clamp the first sensing signal, so that the first sensing signal is not greater than a clamp voltage; wherein the bias sensing circuit is configured to operably adjust the first sensing signal according to the second control signal, so as to adjust the first control signal; whereby, the converter circuit adjusts the output voltage and/or the output current of the output power according to the adjusted first control signal, so that the power retrieval source operates near a maximum power point.

In one embodiment, the bias sensing circuit includes: a sensing capacitor coupled between the input power and the sensing node; and a discharge device, which is configured to operably control whether the sensing capacitor is discharged according to the second control signal, so as to adjust a level of the first sensing signal; wherein the sensing capacitor and the discharge device are connected in parallel between the input power and the sensing node.

In one embodiment, the discharge device includes one of the following or a combination thereof: (1) a transistor switch, wherein the second control signal controls a control terminal of the transistor switch, to thereby control whether the sensing capacitor is discharged; (2) a transistor switch and a single pulse generation circuit, wherein the single pulse generation circuit is coupled between the second comparison circuit and the transistor switch, the single pulse generation circuit being configured to operably generate a single pulse signal according to the second control signal, wherein the single pulse signal controls a control terminal of the transistor switch, to turn ON the transistor switch for a single pulse period of the single pulse signal, thereby discharging the sensing capacitor; (3) a transistor switch and a resistor, wherein the second control signal controls a control terminal of the transistor switch, to thereby control whether the sensing capacitor is discharged; and/or (4) a transistor switch, a single pulse generation circuit and a resistor, wherein the single pulse generation circuit is coupled between the second comparison circuit and the transistor switch, the single pulse generation circuit being configured to operably generate a single pulse signal according to the second control signal, wherein the single pulse signal controls a control terminal of the transistor switch, to turn ON the transistor switch for a single pulse period of the single pulse signal, thereby discharging the sensing capacitor.

In one embodiment, when the input voltage or the output voltage rises to be higher than a voltage threshold or when the input voltage related signal or the output voltage related signal rises to be higher than a second reference voltage, the single pulse generation circuit generates the single pulse signal according to the second control signal, so that the transistor switch is turned ON by the single pulse signal, thereby discharging the sensing capacitor to adjust the level of the first control signal, so that the power retrieval source operates near the maximum power point; wherein the second reference voltage is a signal related to the voltage threshold.

In one embodiment, when the input current or the output current drops to be lower than a current threshold or when the input current related signal or the output current related signal drops to be lower than a reference current, the single pulse generation circuit generates the single pulse signal according to the second control signal, so that the transistor switch is turned ON by the single pulse signal, thereby discharging the sensing capacitor to adjust the level of the first control signal, so that the power retrieval source operates near the maximum power point; wherein the reference current is a signal related to the current threshold.

In one embodiment, when a power of the input power or a power of the output power drops to be lower than a power threshold or when the power related signal of the input power or the power related signal of the output power drops to be lower than a reference power, the single pulse generation circuit generates the single pulse signal according to the second control signal, so that the transistor switch is turned ON by the single pulse signal, thereby discharging the sensing capacitor to adjust the level of the first control signal, so that the power retrieval source operates near the maximum power point; wherein the reference power is a signal related to the power threshold.

In one embodiment, when the first sensing signal exceeds the first reference voltage, the converter circuit raises up the output voltage and/or the output current; and wherein when the first sensing signal does not exceed the first reference voltage, the converter circuit lowers down the output voltage and/or the output current, so that the power retrieval source operates near the maximum power point.

In one embodiment, the voltage threshold is greater than a maximum power point voltage where the power conversion apparatus is in normal operation.

In one embodiment, the current threshold is smaller than a maximum power point current where the power conversion apparatus is in normal operation.

In one embodiment, the clamp voltage is greater than the first reference voltage.

In one embodiment, the first reference voltage is any value between the clamp voltage and zero.

In one embodiment, the first reference voltage is not correlated to an operation parameter of the maximum power point of the power retrieval source.

In one embodiment, the clamp circuit includes one of the following or a combination thereof: (1) a diode, wherein the clamp voltage is related to a forward bias voltage of the diode; (2) a Zener diode, wherein the clamp voltage is related to a Zener voltage of the Zener diode; and/or (3) a transistor having a control terminal coupled to a bias voltage and having a same-phase voltage input end coupled to the sensing node, wherein the clamp voltage is related to the bias voltage and an ON-threshold voltage of the transistor.

In one embodiment, the signal processing circuit further includes: an offset device, wherein the offset device and the bias sensing circuit are connected in series between the input power and the sensing node, the offset device being configured to operably supply an offset voltage, so as to generate the first sensing signal.

In one embodiment, the offset device includes an offset diode, and the offset voltage is related to a forward bias voltage of the offset diode.

In one embodiment, the converter circuit includes a power calculation circuit, the power calculation circuit being configured to operably obtain a power of the input power according to the input voltage and the input current or the power calculation circuit being configured to operably obtain a power of the output power according to the output voltage and the output current.

In one embodiment, when the input voltage increases whereby the clamp circuit starts to function and the clamp circuit clamps the first sensing signal at the clamp voltage, the sensing capacitor samples a voltage difference between the input voltage and the clamp voltage; and when the input voltage decreases whereby the clamp circuit does not function, the sensing capacitor holds the voltage difference such that the first sensing signal is lower than the clamp voltage and the sensing signal is positively correlated with the input voltage.

In one embodiment, the power retrieval source includes a photovoltaic battery, which is configured to operably retrieve a solar power to supply the input power.

In one embodiment, the power retrieval source and the clamp circuit include semiconductor junctions of same characteristics, such that a variation of the clamp voltage and a variation of the input voltage with respect to a temperature change are positively correlated to each other.

From another perspective, the present invention provides a control method for a power conversion apparatus for tracking maximum power point, wherein the power conversion apparatus is configured to receive an input power supplied by a power retrieval source, and the power conversion apparatus includes a converter circuit; the control method comprising: generating a first sensing signal at a sensing node; generating a first control signal according to a difference between the first sensing signal and a first reference voltage; controlling the converter circuit according to the first control signal, to convert the input power to an output power and to supply the output power to a load circuit; sensing a second sensing signal generated by the converter circuit and generating a second control signal according to a difference between the second sensing signal and a reference signal, wherein the second sensing signal includes one of the following or a combination thereof: (1) an input voltage related signal of the input power; (2) an output voltage related signal of the output power; (3) an input current related signal of the input power; (4) an output current related signal of the output power; (5) a power related signal of the input power; and/or (6) a power related signal of the output power; clamping the first sensing signal such that the first sensing signal is not greater than a clamp voltage; adjusting the first sensing signal according to the second control signal, so as to adjust the first control signal; whereby, the converter circuit adjusts the output voltage and/or the output current of the output power according to the adjusted first control signal, so that the power retrieval source operates near a maximum power point.

In one embodiment, the step for adjusting the first sensing signal includes: controlling whether a sensing capacitor is discharged according to the second control signal via a discharge device, so as to adjust a level of the first sensing signal; wherein the sensing capacitor and the discharge device are connected in parallel between the input power and the sensing node.

In one embodiment, the step for adjusting the level of the first sensing signal further includes: when the input voltage or the output voltage rises to be higher than a voltage threshold or when the input voltage related signal or the output voltage related signal rises to be higher than a second reference voltage, the single pulse generation circuit generates the single pulse signal according to the second control signal, so that the transistor switch is turned ON by the single pulse signal, thereby discharging the sensing capacitor to adjust the level of the first control signal, so that the power retrieval source operates near the maximum power point; wherein the second reference voltage is a signal related to the voltage threshold.

In one embodiment, the step for adjusting the level of the first sensing signal further includes: when the input current or the output current drops to be lower than a current threshold or when the input current related signal or the output current related signal drops to be lower than a reference current, the single pulse generation circuit generates the single pulse signal according to the second control signal, so that the transistor switch is turned ON by the single pulse signal, thereby discharging the sensing capacitor to adjust the level of the first control signal, so that the power retrieval source operates near the maximum power point; wherein the reference current is a signal related to the current threshold.

In one embodiment, the step for adjusting the level of the first sensing signal further includes: when a power of the input power or a power of the output power drops to be lower than a power threshold or when the power related signal of the input power or the power related signal of the output power drops to be lower than a reference power, the single pulse generation circuit generates the single pulse signal according to the second control signal, so that the transistor switch is turned ON by the single pulse signal, thereby discharging the sensing capacitor to adjust the level of the first control signal, so that the power retrieval source operates near the maximum power point; wherein the reference power is a signal related to the power threshold.

In one embodiment, the first sensing signal is clamped by one of the following or a combination thereof: (1) a diode, wherein the clamp voltage is related to a forward bias voltage of the diode; (2) a Zener diode, wherein the clamp voltage is related to a Zener voltage of the Zener diode; and/or (3) a transistor having a control terminal coupled to a bias voltage and having a same-phase voltage input end coupled to the sensing node, wherein the clamp voltage is related to the bias voltage and an ON-threshold voltage of the transistor.

The objectives, technical details, features, and effects of the present invention will be better understood with regard to the detailed description of the embodiments below.

DESCRIPTION OF THE PREFERRED EMBODIMENTS

The drawings as referred to throughout the description of the present invention are for illustration only, to show the interrelations between the circuits and the signal waveforms, but not drawn according to actual scale of circuit sizes and signal amplitudes and frequencies.

Figure 1:
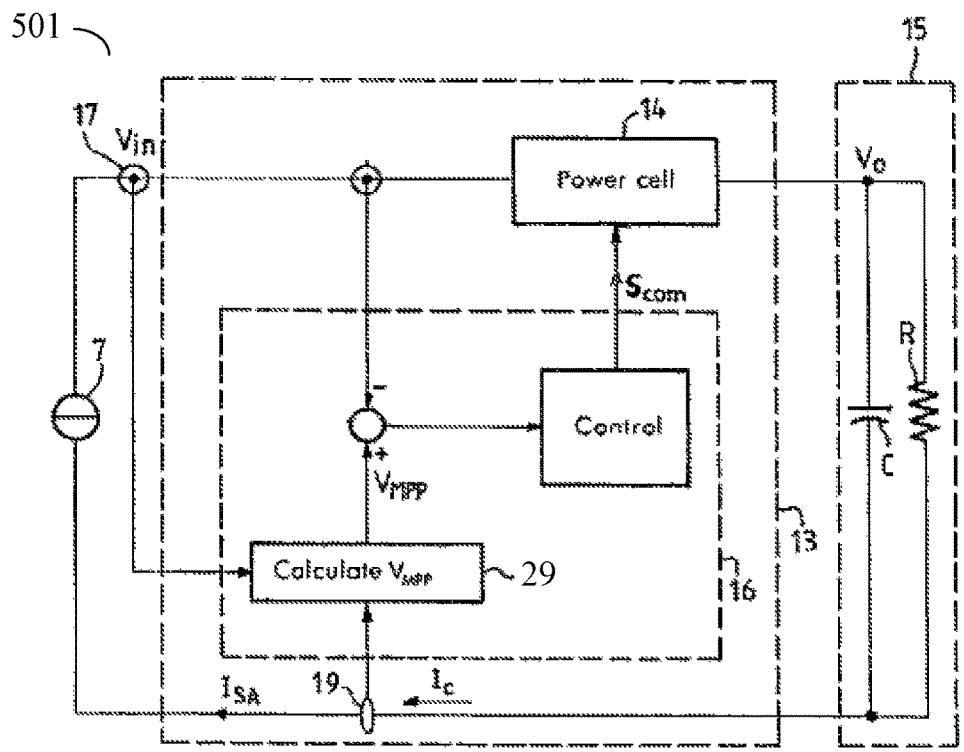
FIG. 1 shows a schematic block diagram of a conventional power conversion apparatus 501 for tracking maximum power point.
Figure 2:
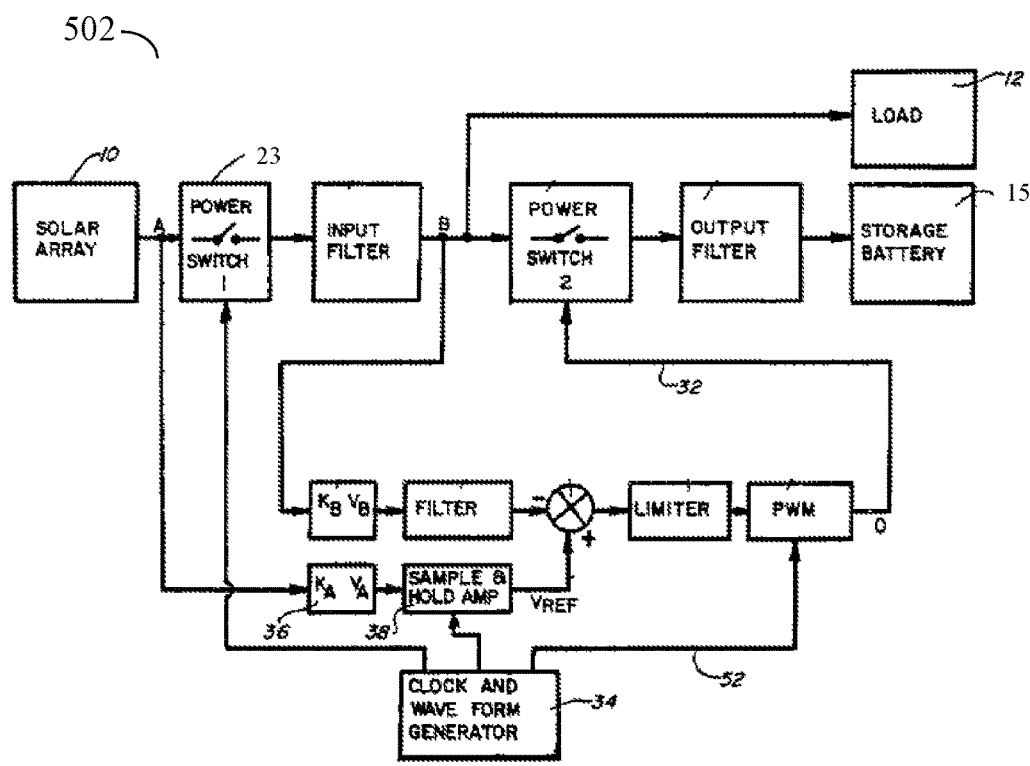
FIG. 2 shows a schematic block diagram of another conventional power conversion apparatus 502 for tracking maximum power point.
Figure 3A:
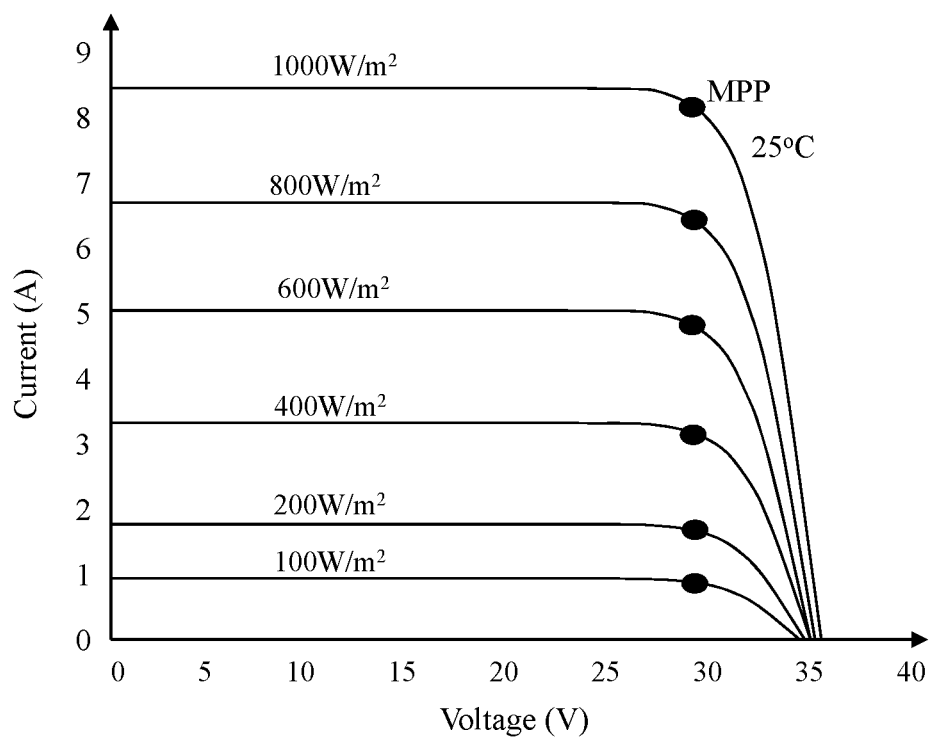
FIG. 3A shows a schematic diagram of a current-voltage characteristic curve of a photovoltaic battery.
Figure 3B:
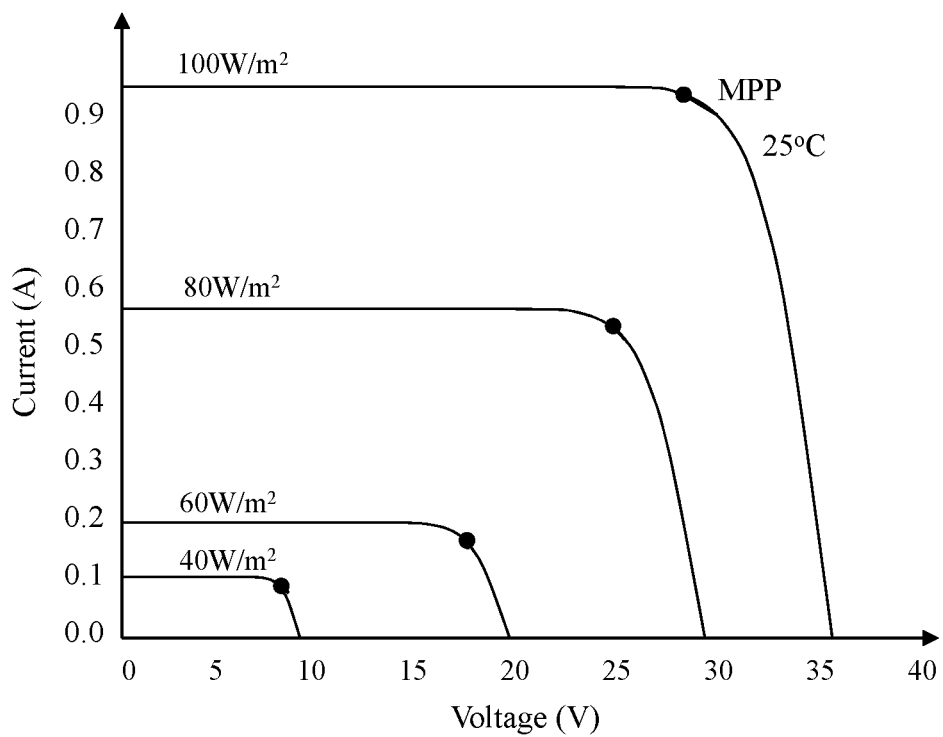
FIG. 3B shows a schematic diagram of a current-voltage characteristic curve of a photovoltaic battery at low illumination intensities.

Please refer to FIG. 3A and FIG. 3B. FIG. 3A shows a schematic diagram of a current-voltage characteristic curve of a photovoltaic battery. FIG. 3B shows a schematic diagram of a current-voltage characteristic curve of a photovoltaic battery at low illumination intensities. FIG. 3A and FIG. 3B show schematic diagrams of current-voltage characteristic curves of a photovoltaic battery at different illumination intensities, respectively. As shown in FIG. 3A, when the illumination intensity is greater than a certain value (e.g., equal to or greater than the value 100 W/m2 as shown in FIG. 3A), the voltage at the Maximum Power Point (MPP) at different illumination intensities is substantially the same (e.g., as shown by the value near 30V in FIG. 3A). FIG. 3B is an enlarged view, demonstrating a schematic diagram of a current-voltage characteristic curve of a photovoltaic battery at low illumination intensities. As shown in FIG. 3B, under a circumstance where the illumination intensity is very low, at different illumination intensities, the MPP voltage varies greatly in correlation with the changes in illumination intensities.

Figure 3C:
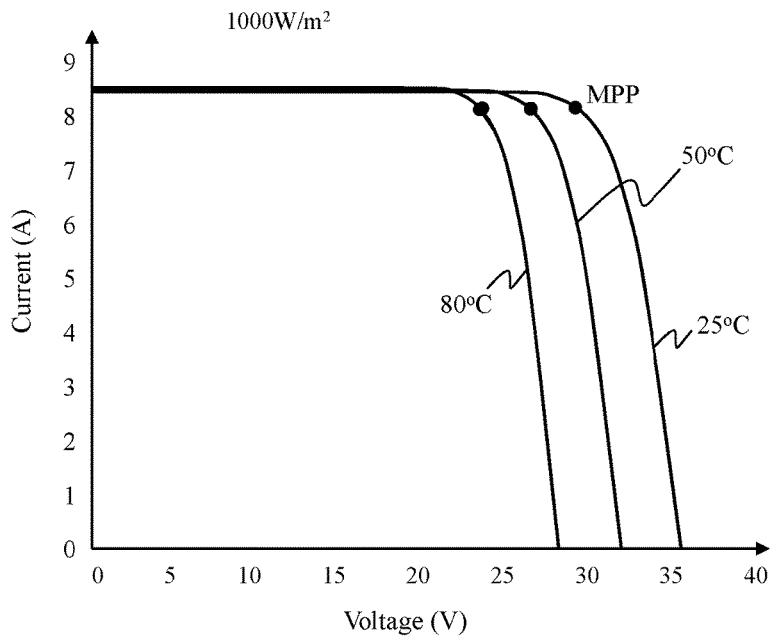
FIG. 3C shows a schematic diagram of a current-voltage characteristic curve of a photovoltaic battery at different temperatures.

Please refer to FIG. 3C, which shows a schematic diagram of a current-voltage characteristic curve of a photovoltaic battery at different temperatures. As shown in FIG. 3C, the MPP voltage of a photovoltaic battery varies in correlation with the changes in temperature. Similarly, under a circumstance where the illumination intensity is very low, the MPP voltage at different illumination intensities varies greatly. In view of this, in addition to the feature that the present invention has merits of simpler circuit configuration and lower cost, the present invention also solves the problem of the variation of the MPP voltage at different low illumination intensities or different temperatures.

Figure 4:
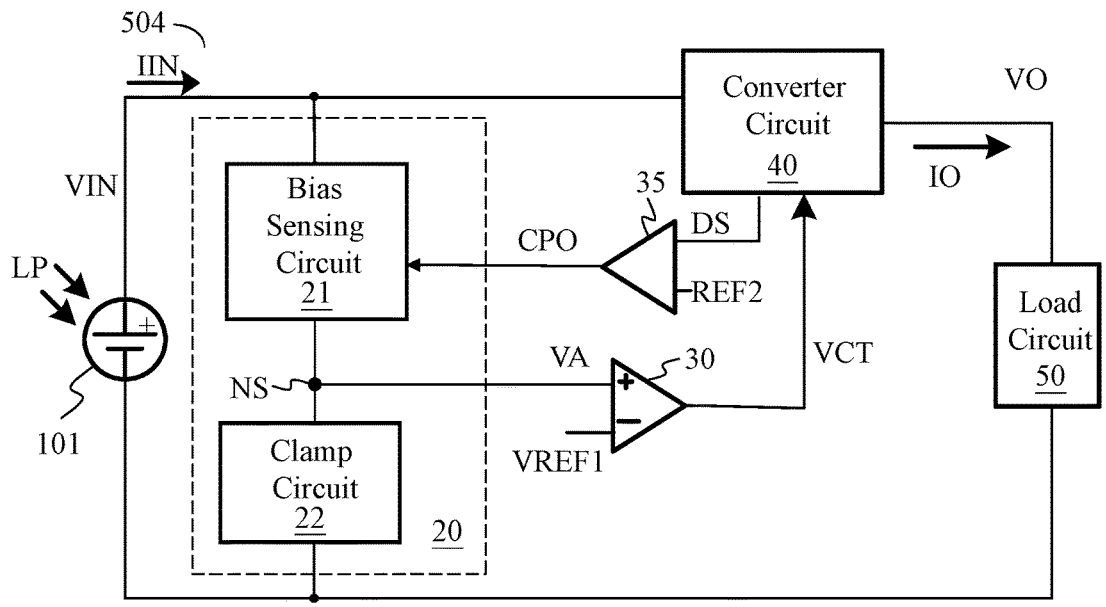
FIG. 4 shows a schematic block diagram of a power conversion apparatus 504 for tracking maximum power point according to an embodiment of the present invention.

Please refer to FIG. 4, which shows a schematic block diagram of a power conversion apparatus (i.e., the power conversion apparatus 504) for tracking maximum power point according to an embodiment of the present invention. As shown in FIG. 4, a photovoltaic battery 101 (which functions as a power retrieval source) retrieves photo energy LP and supplies an input power. In this embodiment, the power conversion apparatus 504 comprises: a signal processing circuit 20, a comparison circuit 30, a comparison circuit 35 and a converter circuit 40. The signal processing circuit 20 is coupled to the input power and is configured to operably generate a sensing signal VA at a sensing node NS according to an input voltage VIN of the input power. The comparison circuit 30 is configured to operably generate a control signal VCT according to a difference between the sensing signal VA and a reference voltage VREF1. The converter circuit 40 is configured to operably convert the input power to an output power according to the control signal VCT, so as to supply the output power to a load circuit 50. The comparison circuit 35 is configured to operably sense a sensing signal DS generated by the converter circuit 40. And, the comparison circuit 35 is configured to operably generate a control signal CPO according to a difference between the sensing signal DS and a reference signal REF2.

Note that the positive and negative signs of the input terminals of the comparison circuit 30 shown in the figure are only an illustrative example, but not for limiting the scope of the present invention.

It is worthwhile noting that, in the present invention, the power retrieval source is not limited to a photovoltaic battery 101; it is also practicable and within the scope of the present invention that the power retrieval source can be any other type of power retrieval source. That is, the input power can come from any form of power source, not limited to the photo energy LP. In one embodiment, the converter circuit 40 for example can be a low dropout regulator (LDO). In another embodiment, the converter circuit 40 for example can be a boost, buck, buck-boost, flyback or inverting switching regulator. In one embodiment, the load circuit 50 for example can be a rechargeable battery or any other type of application circuit.

Figure 16:
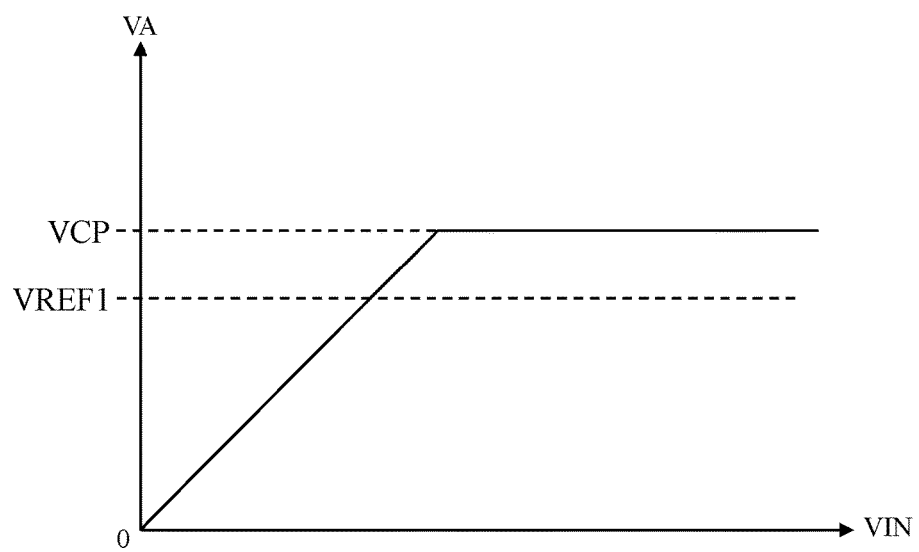
FIG. 16 shows a schematic diagram of a relationship between a sensing signal VA and an input voltage VIN, wherein a relationship between a clamp voltage VCP and a reference voltage VREF1 is shown.

Please refer to FIG. 4 along with FIG. 16. FIG. 16 shows a schematic diagram of a relationship between the sensing signal VA and the input voltage VIN, wherein a relationship between the clamp voltage VCP and the reference voltage VREF1 is shown.

As shown in FIG. 4, the signal processing circuit 20 includes a bias sensing circuit 21 and a clamp circuit 22. The bias sensing circuit 21 is coupled between the input power and the sensing node NS. The bias sensing circuit 21 is configured to operably generate the sensing signal VA at the sensing node NS according to the input voltage VIN. The clamp circuit 22 is coupled to the sensing node NS. The clamp circuit 22 is configured to operably clamp the sensing signal VA, so that the sensing signal VA is not greater than the clamp voltage VCP (for example, FIG. 16 shows that the sensing signal VA is not greater than the clamp voltage VCP).

Please still refer to FIG. 4. In one embodiment, the present invention is characterized in that: the comparison circuit 35 senses the sensing signal DS generated by the converter circuit 40 and generates the control signal CPO according to the difference between the sensing signal DS and the reference signal REF2, and the control signal CPO generated by the comparison circuit 35 controls the bias sensing circuit 21.

Figure 6:
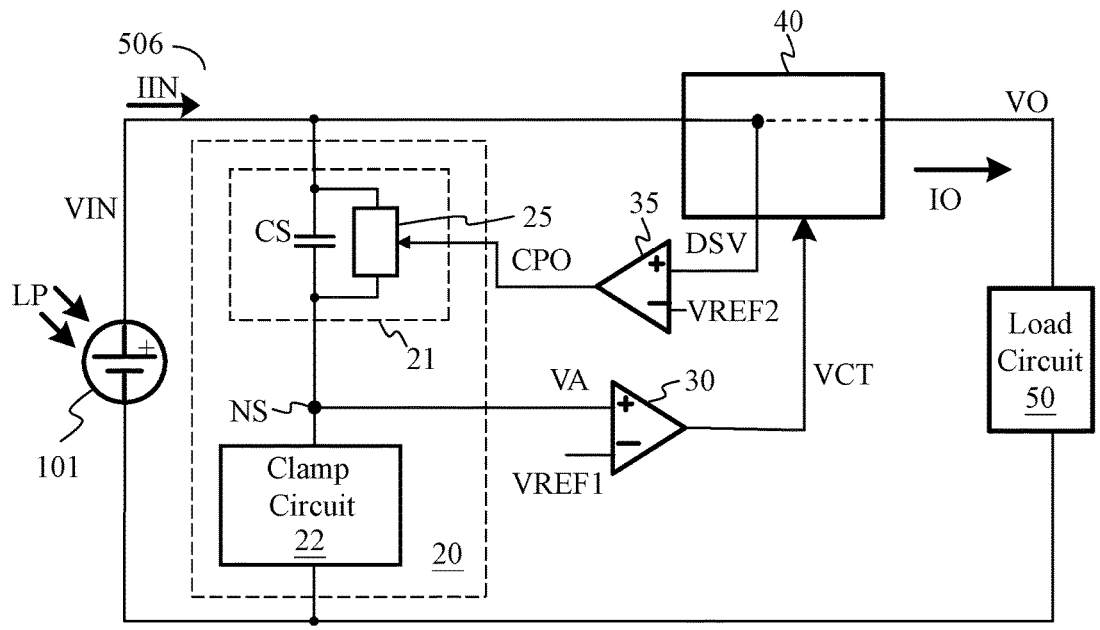
FIG. 6 shows an embodiment of a sensing signal DS and an embodiment of a reference signal REF2 of the present invention.

Please refer to FIG. 4 along with FIG. 6. FIG. 6 shows an embodiment of the sensing signal DS and an embodiment of the reference signal REF2 of the present invention.

As shown in FIG. 4 and FIG. 6, in one embodiment, the sensing signal DS can be, for example but not limited to, an input voltage related signal DSV (which is related to the input voltage VIN of the input power) and/or an output voltage related signal DSV (which is related to the output voltage VO of the output power). Under such circumstance, the reference signal REF2 can correspondingly be, for example but not limited to, a reference voltage VREF2.

Figure 7:
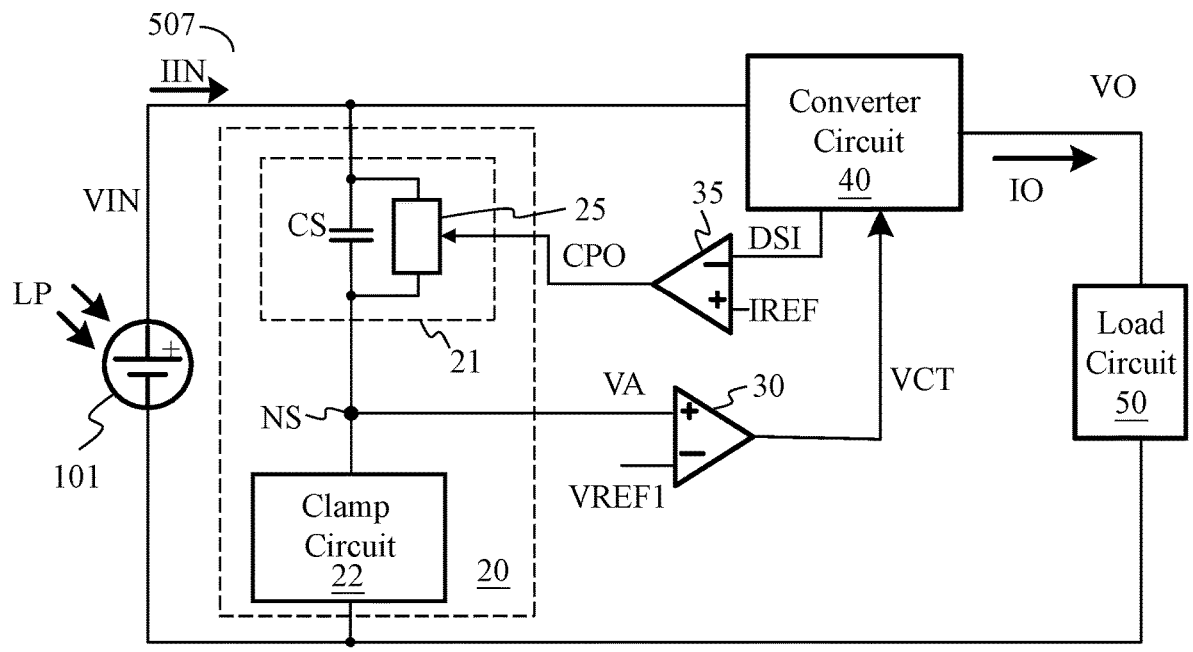
FIG. 7 shows another embodiment of a sensing signal DS and another embodiment of a reference signal REF2 of the present invention.

Please refer to FIG. 4 along with FIG. 7. FIG. 7 shows another embodiment of the sensing signal DS and another embodiment of the reference signal REF2 of the present invention.

As shown in FIG. 4 and FIG. 7, in another embodiment, the sensing signal DS can be, for example but not limited to, an input current related signal DSI (which is related to the input current IIN of the input power) and/or an output current related signal DSI (which is related to the output current IO of the output power). Under such circumstance, the reference signal REF2 can correspondingly be, for example but not limited to, a reference current IREF.

Figure 8:
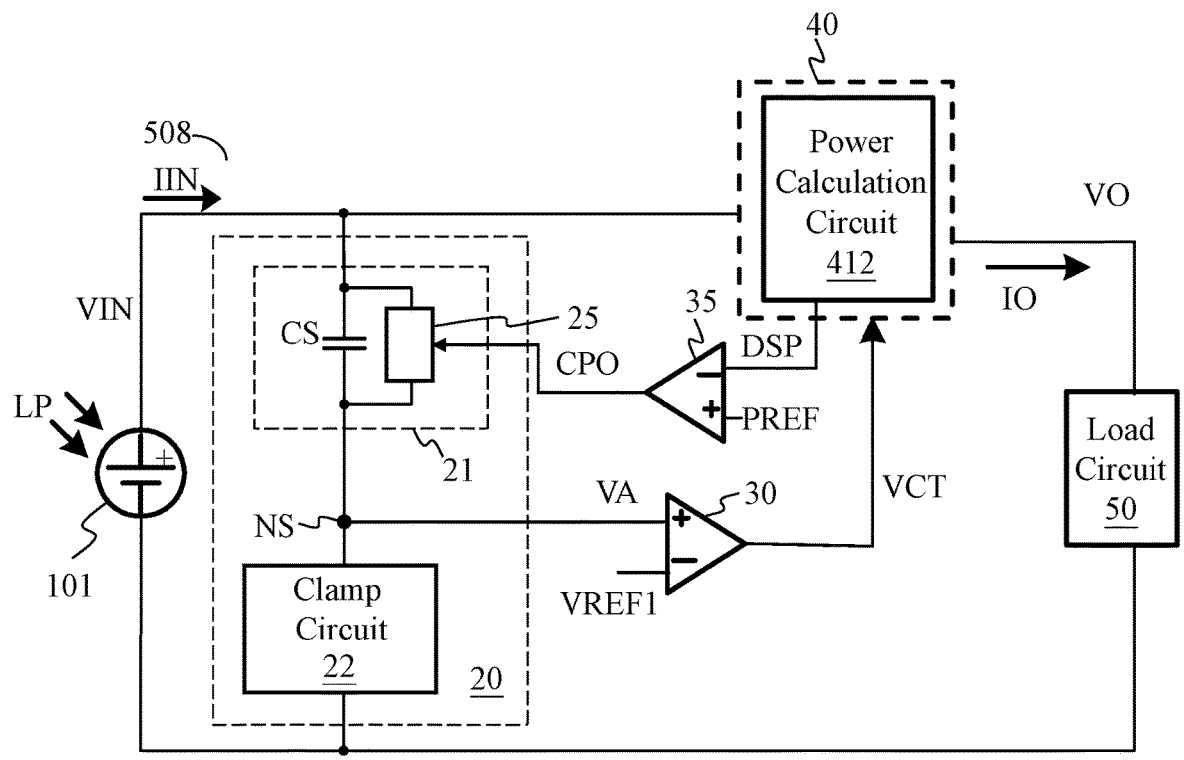
FIG. 8 shows yet another embodiment of a sensing signal DS and yet another embodiment of a reference signal REF2 of the present invention and shows an embodiment of a power calculation circuit 412 of a converter circuit 40 of the present invention.

Please refer to FIG. 4 along with FIG. 8. FIG. 8 shows yet another embodiment of the sensing signal DS and yet another embodiment of the reference signal REF2 of the present invention, and shows an embodiment of a power calculation circuit 412 of a converter circuit 40 of the present invention.

As shown in FIG. 4 and FIG. 8, in yet another embodiment, the sensing signal DS can be, for example but not limited to, a power related signal DSP which is related to the input power and/or a power related signal DSP which is related to the output power. Under such circumstance, the reference signal REF2 can correspondingly be, for example but not limited to, a reference power PREF.

It is noteworthy that, in one embodiment, the converter circuit 40 can include a power calculation circuit 412. In one embodiment, the power calculation circuit 412 is configured to operably obtain a power PIN of the input power according to the input voltage VIN and the input current IIN. That is, the power PIN of the input power is equal to a product of the input current IIN multiplied by the input voltage VIN, as represented by the following equation: PIN=IIN*VIN.

Besides, in another embodiment, the power calculation circuit 412 is configured to operably obtain a power PO of the output power according to the output voltage VO and the output current IO. That is, the power PO of the output power is equal to a product of the output current IO multiplied by the output voltage VO, as represented by the following equation: PO=IO*VO.

It is noteworthy that, in still another embodiment, the sensing signal DS can include, for example but not limited to, a combination of two or more of the above-mentioned three embodiments.

Please still refer to FIG. 4. In one embodiment, the present invention is characterized in that: on one hand, the comparison circuit 30 generates the control signal VCT according to the difference between the sensing signal VA and the reference voltage VREF1, whereby the power conversion apparatus 504 can control the converter circuit 40 according to the control signal VCT, to convert the input power to an output power. On the other hand, as described above, the power conversion apparatus 504 senses the sensing signal DS generated by the converter circuit 40 via the comparison circuit 35, and the comparison circuit 35 generates the control signal CPO according to the difference between the sensing signal DS and the reference signal REF2; the control signal CPO generated by the comparison circuit 35 controls the bias sensing circuit 21. That is, the power conversion apparatus 504 can further control the bias sensing circuit 21 via the control signal CPO, so that the bias sensing circuit 21 can adjust the sensing signal VA according to the control signal CPO (the features and the details as to how the control signal CPO controls the bias sensing circuit 21 to adjust the sensing signal VA will be described later). As a consequence, the power conversion apparatus 504 can adjust the control signal VCT, so that the converter circuit 40 is controlled via an "adjusted" control signal VCT to adjust the output voltage VO and/or the output current IO of the output power, whereby the photovoltaic battery 101 can operate substantially near the maximum power point (MMP).

In brief, the present invention is characterized and advantageous in that: first, the power conversion apparatus 504 controls the converter circuit 40 via the control signal VCT, wherein the generation of the control signal VCT is in correlation with the sensing signal VA generated by the signal processing circuit 20. Second, the power conversion apparatus 504 senses the sensing signal DS generated by the converter circuit 40 via the comparison circuit 35 and the comparison circuit 35 generates the control signal CPO according to the sensing signal DS, wherein he generation of the control signal CPO is in correlation with the sensing signal DS. Because the power conversion apparatus 504 can control the bias sensing circuit 21 via the control signal CPO, the bias sensing circuit 21 can adjust the sensing signal VA according to the control signal CPO. As a consequence, the comparison circuit 30 of the power conversion apparatus 504 can generate an adjusted control signal VCT according to the difference between the adjusted sensing signal VA and the reference voltage VREF1. Thus, the power conversion apparatus 504 can control the converter circuit 40 via the adjusted control signal VCT to adjust the output voltage VO and/or the output current IO of the output power, so that the photovoltaic battery 101 can operate substantially near the maximum power point (MMP).

Note that, because the MPP varies in correlation with the changes in illumination intensities or temperatures, and the circuit devices may have inherent mismatches, the term "operate substantially near" does require the photovoltaic battery 101 to operate precisely at the maximum power point (MPP); instead, a tolerable error is acceptable.

The features and the details as to how the control signal CPO controls the bias sensing circuit 21 to adjust the sensing signal VA will be explained hereinafter.

Figure 5:
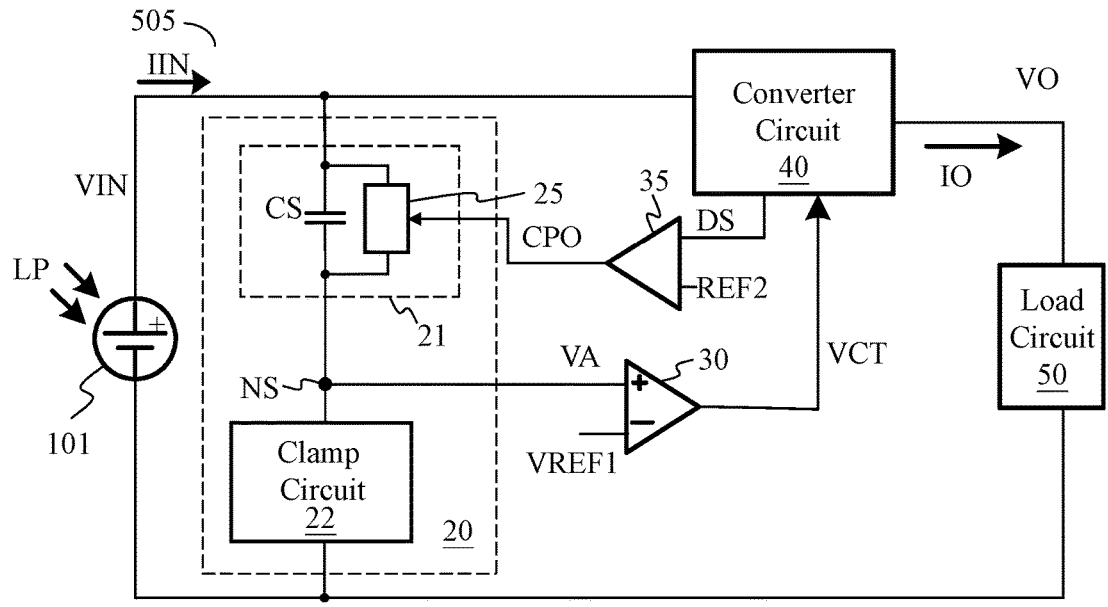
FIG. 5 shows an embodiment of a bias sensing circuit 21 of the present invention.

Please refer to FIG. 5, which shows an embodiment of a bias sensing circuit 21 of the present invention. As shown in FIG. 5, in one embodiment, the bias sensing circuit 21 includes: a sensing capacitor CS and a discharge device 25. The sensing capacitor CS is coupled between the input power and the sensing node NS. As shown in FIG. 5, the sensing capacitor CS and the discharge device 25 are connected in parallel between the input power and the sensing node NS. The discharge device 25 is configured to operably control whether the sensing capacitor CS is discharged according to the control signal CPO, so as to adjust a level of the sensing signal VA.

The present invention is advantageous in that: the present invention can control the bias sensing circuit 21 via the control signal CPO, so as to adjust the sensing signal VA. To be more specific, the present invention can control the discharge device 25 of the bias sensing circuit 21 via the control signal CPO; the discharge device 25 controls the sensing capacitor CS of the bias sensing circuit 21 according to the control signal CPO, so as to adjust the level of the sensing signal VA.

In one embodiment, the discharge device 25 can discharge the sensing capacitor CS according to the control signal CPO, so as to raise up the level of the sensing signal VA.

Figure 9:
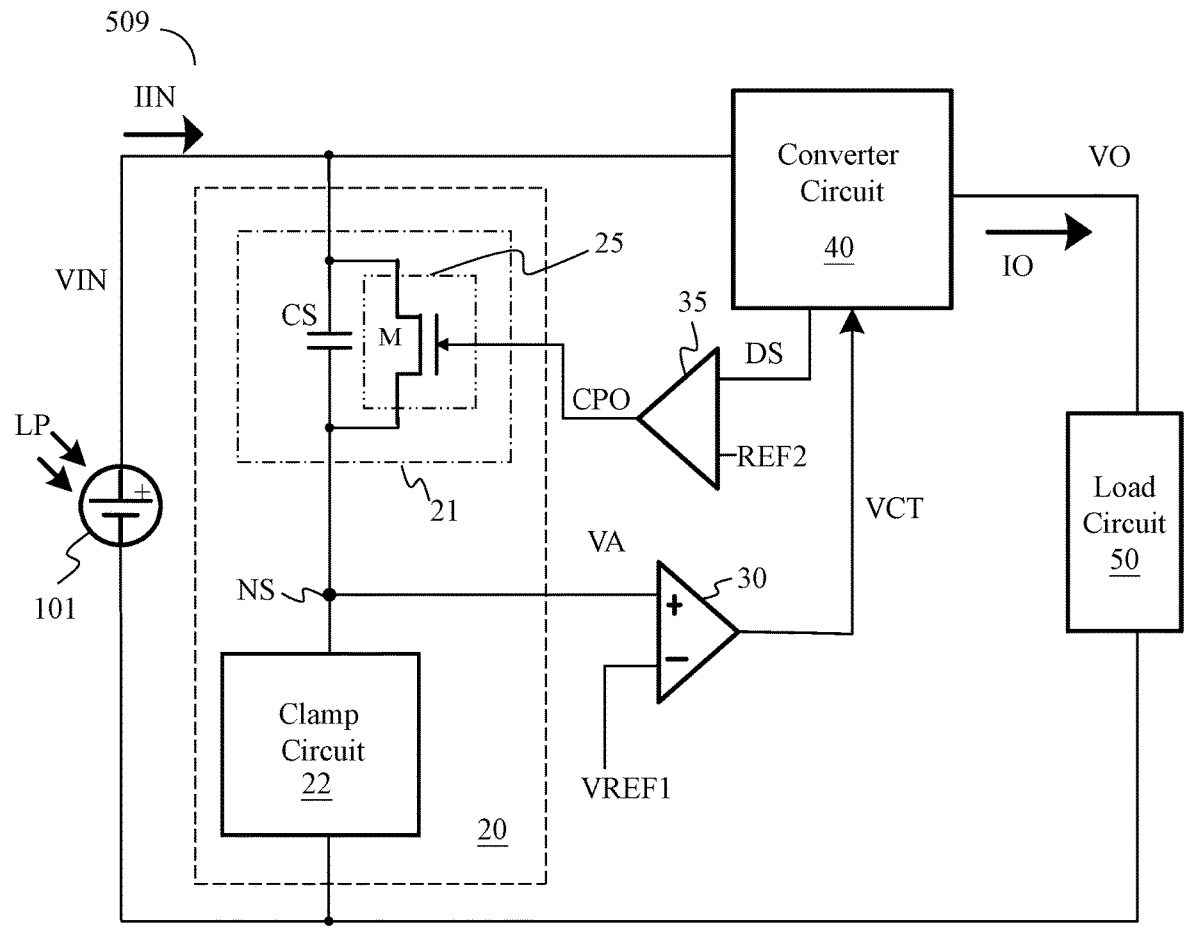
FIG. 9 shows an embodiment of a discharge device 25 of the present invention.

Please refer to FIG. 9 in conjugation with FIG. 5. FIG. 9 shows an embodiment of a discharge device 25 of the present invention. As shown in FIG. 9, in one embodiment, the discharge device 25 can be, for example but not limited to, a transistor switch M. In this embodiment, the control signal CPO can be arranged to control a control terminal of the transistor switch M, to control the conduction of the transistor switch M, thereby controlling whether the sensing capacitor CS is discharged.

In this embodiment, the present invention can control the bias sensing circuit 21 via the control signal CPO, so as to adjust the sensing signal VA. To be more specific, the present invention can control the discharge device 25 (the transistor switch M in FIG. 9) of the bias sensing circuit 21 via the control signal CPO, to discharge the sensing capacitor CS of the bias sensing circuit 21 according to the control signal CPO, so as to adjust the level of the sensing signal VA.

In one embodiment, the transistor switch M is turned ON according to the control signal CPO to discharge the sensing capacitor CS, so as to raise up the level of the sensing signal VA.

Figure 10:
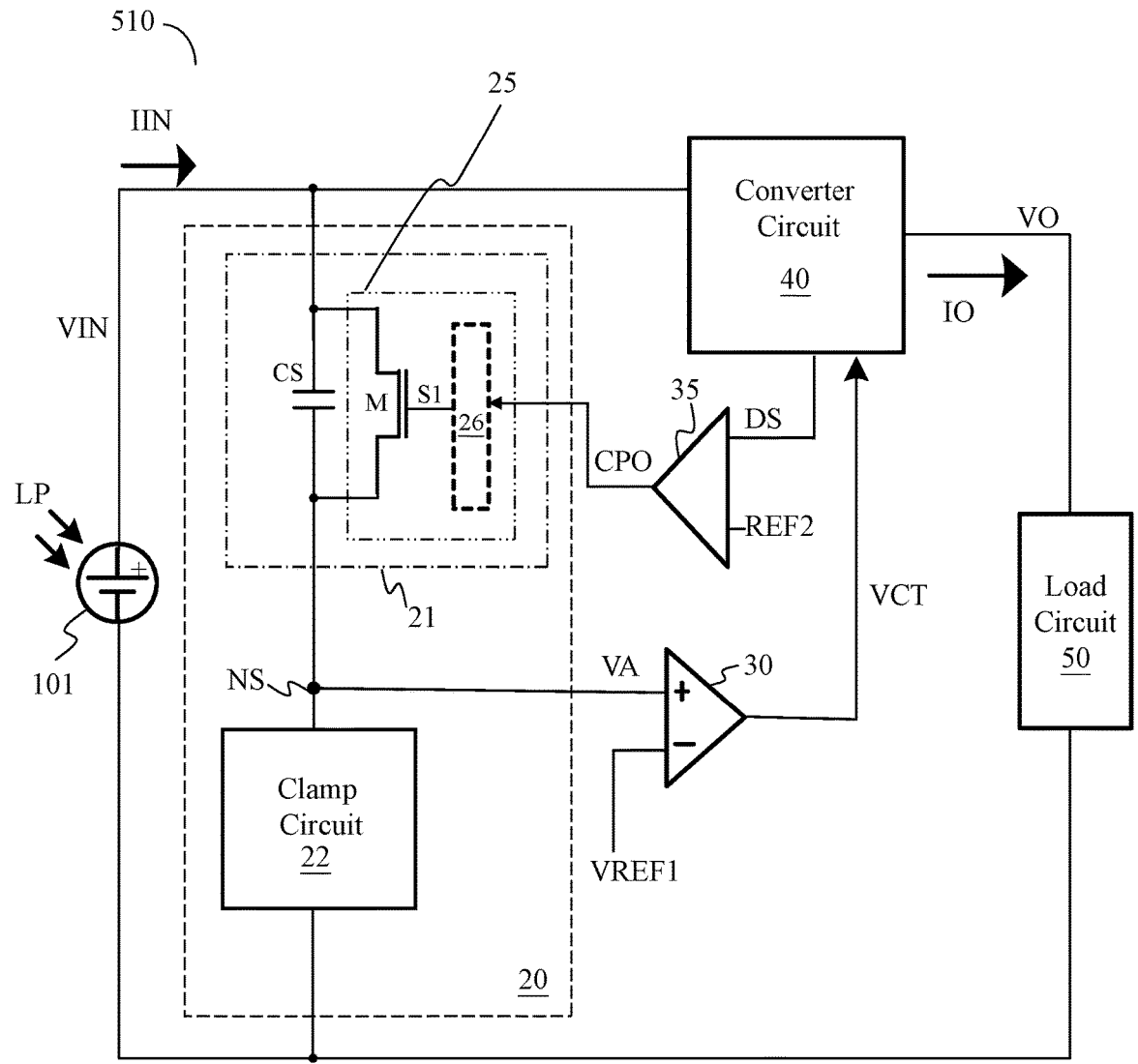
FIG. 10 shows another embodiment of a discharge device 25 of the present invention.

Please refer to FIG. 10 in conjugation with FIG. 5. FIG. 10 shows another embodiment of a discharge device 25 of the present invention. As shown in FIG. 10, in one embodiment, the discharge device 25 can include, for example but not limited to, a transistor switch M and a single pulse generation circuit 26. The single pulse generation circuit 26 is coupled between the comparison circuit 35 and the transistor switch M. The single pulse generation circuit 26 is configured to operably generate a single pulse signal S1 according to the control signal CPO. In this embodiment, the single pulse signal S1 controls a control terminal of the transistor switch M, to turn ON the transistor switch M for a single pulse period PS (e.g., as shown in FIGS. 13B'14B and 15) corresponding to the single pulse signal S1, thereby discharging the sensing capacitor CS.

In this embodiment, the present invention can control the bias sensing circuit 21 via the control signal CPO, so as to adjust the sensing signal VA. To be more specific, the present invention can control the discharge device 25 (the transistor switch M and the single pulse generation circuit 26 in FIG. 10) of the bias sensing circuit 21 via the control signal CPO, wherein the single pulse generation circuit 26 can control the conduction of the transistor switch M to discharge the sensing capacitor CS of the bias sensing circuit 21 according to the control signal CPO, so as to adjust the level of the sensing signal VA.

In one embodiment, the single pulse generation circuit 26 can generate the single pulse signal S1 according to the control signal CPO. The single pulse signal S1 turns ON the transistor switch M for the single pulse period PS, to discharge the sensing capacitor CS according to the control signal CPO, so as to raise up the level of the sensing signal VA.

Figure 11:
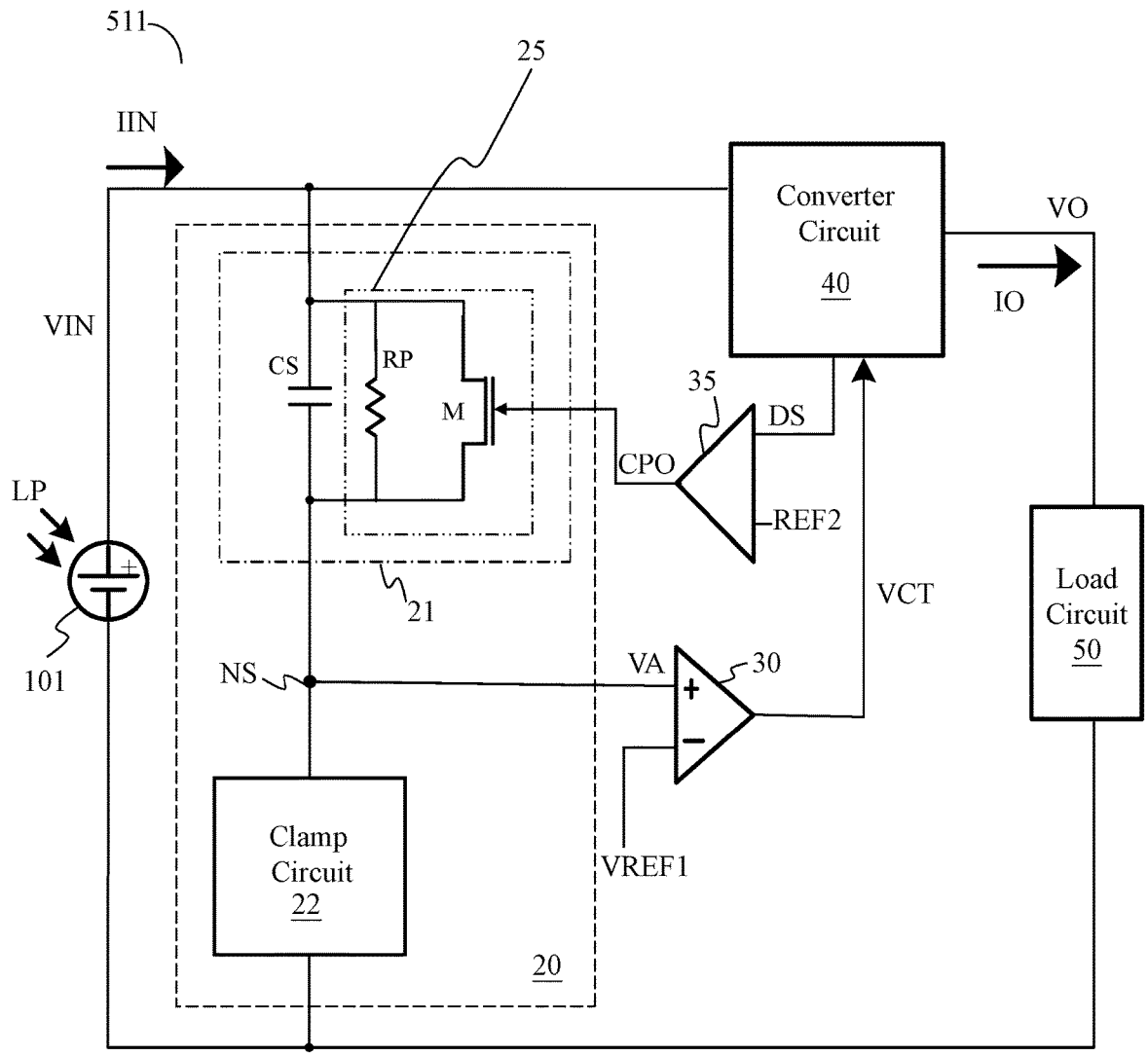
FIG. 11 shows yet another embodiment of a discharge device 25 of the present invention.

Please refer to FIG. 11 in conjugation with FIG. 5. FIG. 11 shows yet another embodiment of a discharge device 25 of the present invention. As shown in FIG. 11, in one embodiment, the discharge device 25 can include, for example but not limited to, a transistor switch M and a resistor RP. This embodiment of FIG. 11 is similar to the embodiment of FIG. 9, but is different in that the embodiment of FIG. 11 further includes a resistor RP. As shown in FIG. 11, the transistor switch M and the resistor RP are connected in parallel between the input power and the sensing node NS. The transistor switch M in the embodiment of FIG. 11 operates in the same way as the transistor switch M in the embodiment of FIG. 9, so the details thereof are not redundantly repeated here, and only the implementation details of the resistor RP are explained below.

In one embodiment, preferably, the resistance of the resistor RP and the capacitance of the sensing capacitor CS are so arranged that the sensing capacitor CS can hold the voltage difference (i.e., VIN-VCP) for at least a predetermined holding period (the features and the details of the clamp voltage VCP will be described later). In one embodiment, the predetermined holding period is related to an operation bandwidth of the power conversion apparatus. In one embodiment, the resistor RP can be a parasitic resistor of the sensing capacitor CS; in this case, because an actual resistor device is not required, the cost can be reduced.

In addition, according to the present invention, the operation point of the photovoltaic battery 101 can be adjusted by selecting or adjusting the resistance of the resistor RP. For example, by selecting or adjusting the resistance of the resistor RP to be a relatively low resistance, the photovoltaic battery 101 can be adjusted to operate at a relatively low voltage (i.e., a relatively low MPP voltage); by selecting or adjusting the resistance of the resistor RP to be a relatively high resistance, the photovoltaic battery 101 can be adjusted to operate at a relatively high voltage (i.e., a relatively high MPP voltage).

Figure 12:
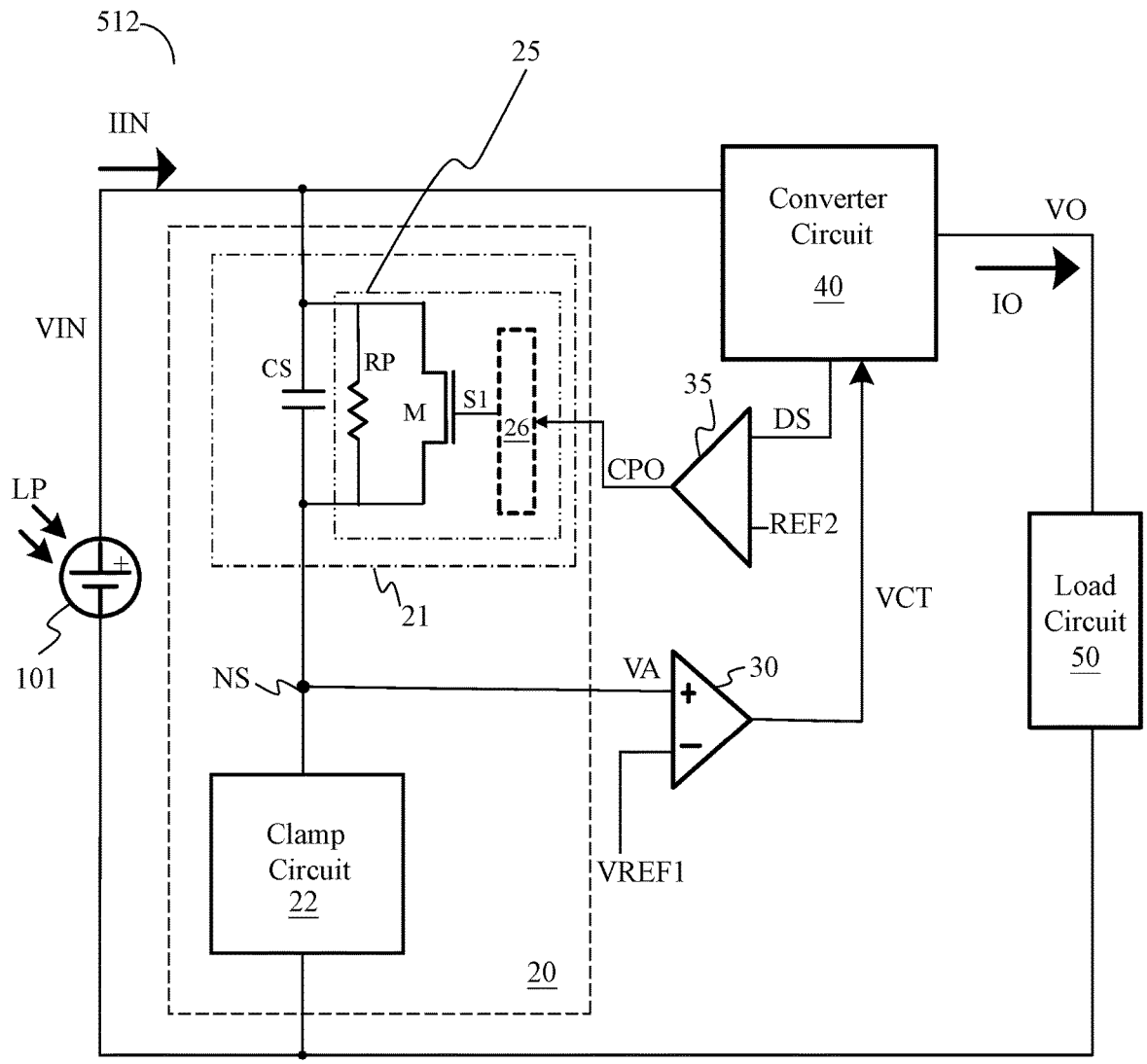
FIG. 12 shows still another embodiment of a discharge device 25 of the present invention.

Please refer to FIG. 12 in conjugation with FIG. 5. FIG. 12 shows still another embodiment of a discharge device 25 of the present invention. As shown in FIG. 12, in one embodiment, the discharge device 25 can include, for example but not limited to, a transistor switch M, a single pulse generation circuit 26 and a resistor RP. This embodiment of FIG. 12 is similar to the embodiment of FIG. 10, but is different in that: the embodiment of FIG. 12 further includes a resistor RP. The transistor switch M single and the single pulse generation circuit 26 in the embodiment of FIG. 12 operate in the same way as the transistor switch M and the single pulse generation circuit 26 in the embodiment of FIG. 10, so the details thereof are not redundantly repeated here. Besides, the resistor RP in the embodiment of FIG. 12 operates in the same way as the resistor RP in the embodiment of FIG. 11, so the details thereof are not redundantly repeated here.

The above-mentioned embodiments shown in FIGS. 9 to 12 illustrate exemplary features and details of the discharge device 25. As illustrated, the present invention can control the discharge device 25 of the bias sensing circuit 21 via the control signal CPO, thereby controlling whether the sensing capacitor CS of the bias sensing circuit 21 is discharged, so as to adjust the level of the sensing signal VA. Those skilled in this art can readily conceive to modify the discharge device 25 of the above-mentioned four embodiments shown in FIGS. 9 to 12 by a combination of two or more of the above-mentioned embodiments, which should fall within the scope of the present invention.

The above description explains how the bias sensing circuit 21 of the signal processing circuit 20 functions so that the power conversion apparatus 504 can control the bias sensing circuit 21 via the control signal CPO to adjust the sensing signal VA, and thereby to adjust the control signal VCT, so that the power conversion apparatus 504 can control the converter circuit 40 via the adjusted control signal VCT.

As described above, in the present invention, the comparison circuit 30 is configured to operably generate the control signal VCT according to the difference between the sensing signal VA generated by the signal processing circuit 20 and the reference voltage VREF1. Thus, the power conversion apparatus 504 can control the converter circuit 40 via the control signal VCT, such that the converter circuit 40 can convert the input power to the output power according to the control signal VCT, so as to supply the output power to a load circuit 50. How the clamp circuit 22 of the signal processing circuit 20 functions to assist the above mechanism will be explained in the following paragraphs.

Please refer to FIG. 5 along with FIG. 16. In this embodiment, when the input voltage VIN increases above a certain level whereby the clamp circuit 22 starts to function, the clamp circuit 22 clamps the sensing signal VA at the clamp voltage VCP, and the sensing capacitor CS samples a voltage difference (i.e., VIN-VCP) between the input voltage VIN and the clamp voltage VCP; when the input voltage VIN decreases below a certain level whereby the clamp circuit 22 does not function, the sensing capacitor CS holds the voltage difference (i.e., VIN-VCP) such that the sensing signal VA is lower than the clamp voltage VCP and the sensing signal VA is positively correlated with the input voltage VIN. From another perspective, the sensing capacitor CS can be regarded as high pass filter, by which the sensing signal VA is configured to respond to the high-frequency changes in the input voltage VIN.

In the present invention, that the clamp circuit 22 "functions" or "does not function" should be understood as thus. For example, when the input voltage VIN is very high, and if there is no clamp circuit, then the sensing signal VA generated by the bias sensing circuit 21 according to the input voltage VIN will be greater than the clamp voltage VCP; however, if a clamp circuit 22 is provided as taught by the present invention, the clamp circuit 22 will clamp the sensing signal VA to be at the clamp voltage VCP, so that the sensing signal VA is not greater than the clamp voltage VCP, and this means that the clamp circuit 22 functions. On the other hand, when the sensing signal VA generated by the bias sensing circuit 21 according to the input voltage VIN is lower than the clamp voltage VCP, because the sensing signal VA is lower than the clamp voltage VCP, the clamp circuit 22 does not control the level of the sensing signal VA and this means that the clamp circuit 22 does not function (to clamp the sensing signal VA). From one perspective, when the clamp circuit 22 does not function, the clamp circuit 22 has a high output resistance, and when the clamp circuit 22 functions, the clamp circuit 22 has a low output resistance.

In one embodiment, when the sensing signal VA exceeds the reference voltage VREF1, the converter circuit 40 raises up the output voltage VO and/or the output current IO. When the sensing signal VA does not exceed the reference voltage VREF, the converter circuit 40 lowers down the output voltage VO and/or the output current IO. Thus, the photovoltaic battery 101 is controlled to operate substantially near the MPP. According to the present invention, under a dynamic steady state, the sensing signal VA will be at a level which is substantially near the reference voltage VREF1 by the above-mentioned loop control.

As shown in FIG. 16, in one embodiment, the clamp voltage VCP can be set to be greater than the reference voltage VREF1; in one preferred embodiment, the clamp voltage VCP is set to be slightly greater than the reference voltage VREF1, such that when the input voltage VIN varies (e.g. because of changes in load condition, changes in illumination intensities or changes in temperatures), the power conversion apparatus can respond to the variation within a short time, to control the operation loop such that the photovoltaic battery 101 can rapidly track the updated MPP in response to the changes.

In one embodiment, according to the present invention, the reference voltage VREF1 is not required to be directly correlated to operation parameters of the photovoltaic battery 10 such as the voltage, current or MPP of the photovoltaic battery 10. That is, as shown in FIG. 16, in one embodiment, the reference voltage VREF1 can be any value between the clamp voltage VCP and zero.

Please refer to FIG. 3B in in conjugation with FIG. 5. As shown in FIG. 3B, under a circumstance where the illumination intensity is very low (e.g., equal to or lower than the value 100 W/m² shown in FIG. 3B), at different illumination intensities or temperatures, the MPP voltage of the photovoltaic battery 101 varies greatly in accordance with the changes in the illumination intensities or temperatures. However, according to the present invention, the setting of the reference voltage VREF1 has a great flexibility (i.e., the reference voltage VREF1 is not required to be directly correlated to operation parameters of the photovoltaic battery 101 such as the voltage, current or MPP of the photovoltaic battery 101), and from one perspective, this means that even under a very low illumination intensity, it is not required to adjust the reference voltage VREF1 in correspondence to different illumination intensities, and via the above-mentioned operation, the power conversion apparatus of the present invention can automatically track the MPP of the photovoltaic battery 101 and operate near the MPP.

For a power conversion apparatus, its MPP voltage in normal operation has a trackable range, that is, there is a minimum trackable voltage (VMIN) and there is a maximum trackable voltage (VMAX) for the MPP voltage. According to the present invention, in one embodiment, in correspondence to the same reference voltage VREF1, the minimum trackable voltage VMIN of the power conversion apparatus can be equal to or lower than ½ of the maximum trackable voltage VMAX. In one preferred embodiment, in correspondence to the same reference voltage VREF1, the minimum trackable voltage VMIN of the power conversion apparatus can be equal to or lower than ⅕ of the maximum trackable voltage VMAX. In one more preferred embodiment, in correspondence to the same reference voltage VREF1, the minimum trackable voltage VMIN of the power conversion apparatus can be equal to or lower than 1/10 of the maximum trackable voltage VMAX. Under a circumstance where the illumination intensity is very low, as mentioned above, the MPP voltage of the power conversion apparatus will be greatly decreased as the illumination intensity decreases. However, the power conversion apparatus of the present invention, by the same reference voltage VREF1, has a very broad range of tractable MPP voltage. As thus, the present invention is advantageous in an environment having low illumination intensity, such as for retrieving indoor illumination energy and converting such indoor illumination energy to electricity.

The following paragraphs will explain how the bias sensing circuit 21 of the signal processing circuit 20 functions according to the control signal CPO to adjust the sensing signal VA, and thereby to adjust the control signal VCT, so that the power conversion apparatus 504 can control the converter circuit 40 via the adjusted control signal VCT.

Figure 13A:
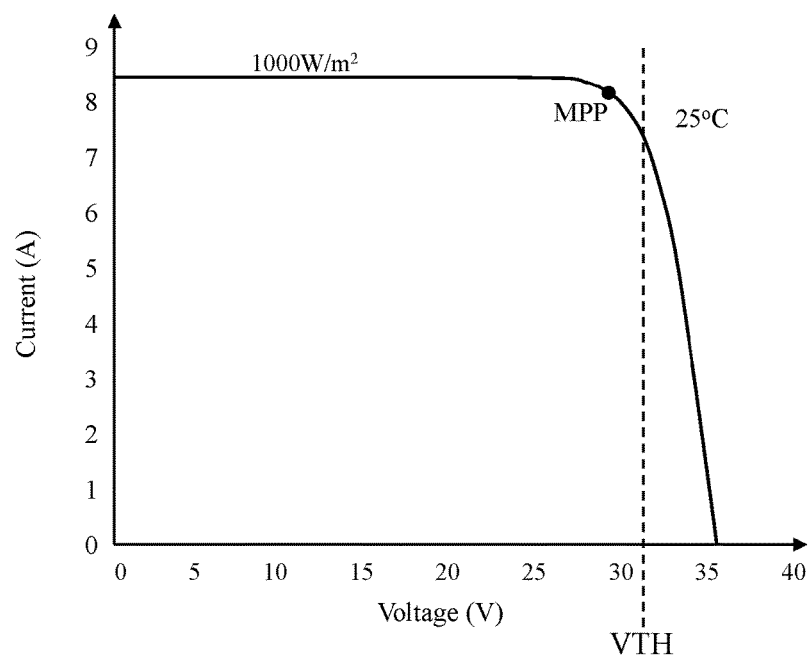
FIG. 13A shows a schematic diagram of a relationship between a voltage threshold VTH and a maximum power point voltage where the power conversion apparatus is in normal operation.
Figure 13B:
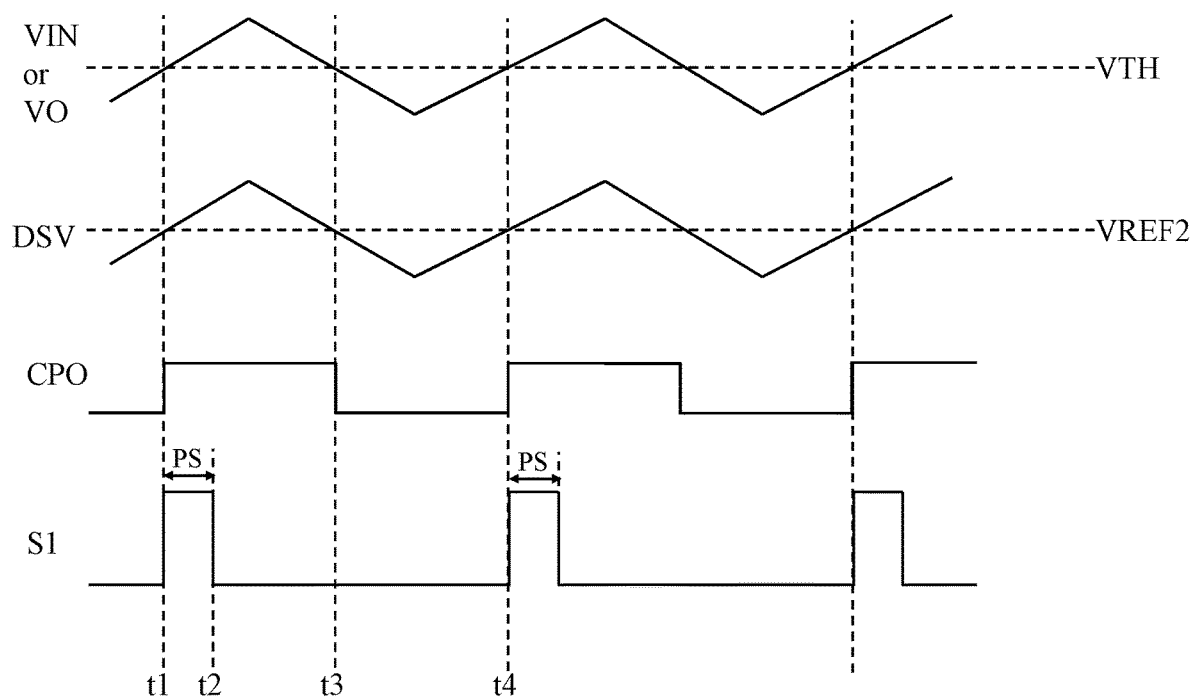
FIG. 13B shows a schematic diagram of signal waveforms of the power conversion apparatus according to an embodiment of the present invention.

Please refer to FIGS. 13A and 13B in conjugation with FIGS. 9 and 10. FIG. 13A shows a schematic diagram of a relationship between a voltage threshold VTH and a maximum power point voltage where the power conversion apparatus is in normal operation. FIG. 13B shows a schematic diagram of signal waveforms of the power conversion apparatus according to an embodiment of the present invention.

As shown in FIG. 13B, in one embodiment, when the input voltage VIN or the output voltage VO rises to be higher than the voltage threshold VTH (e.g., as shown by the period from the timing point t1 to the timing point t3 in FIG. 13B) or when the input voltage related signal DSV or the output voltage related signal DSV rises to be higher than the reference voltage VREF2 (e.g., as shown by the period from the timing point t1 to the timing point t3 in FIG. 13B), the single pulse generation circuit 26 generates the single pulse signal S1 according to the control signal CPO, so that the transistor switch M is turned ON by the single pulse signal S1 for the single pulse period PS (e.g., as shown by the period from the timing point t1 to the timing point t2 in FIG. 13B), thereby discharging the sensing capacitor CS; and thus, the level of the control signal VA is raised up. Under such circumstance, since the level of the control signal VA has been raised up, in one embodiment, when the level of the control signal VA is raised up to exceed the reference voltage VREF1, the comparison circuit 30 can generate the adjusted control signal VCT according to the difference between the raised sensing signal VA and the reference voltage VREF1. Thus, the power conversion apparatus 510 can control the converter circuit 40 via the adjusted control signal VCT, to raise up the output voltage VO and/or the output current IO of the output power according to the adjusted control signal VCT, so that the photovoltaic battery 101 can operate substantially near the maximum power point (MMP).

It is worthwhile noting that, in one embodiment, as shown in FIG. 13A, the voltage threshold VTH can be set to be greater than the MPP voltage where the power conversion apparatus is in normal operation.

Referring to FIG. 13B, in one embodiment, the level of the input voltage related signal DSV can be, for example but not limited to, equal to the level of the input voltage VIN, and the level of the output voltage related signal DSV can be, for example but not limited to, equal to the level of the output voltage VO. In another embodiment, the level of the input voltage related signal DSV can be, for example but not limited to, positively correlated to the level of the input voltage VIN, and the level of the output voltage related signal DSV can be, for example but not limited to, positively correlated to the level of the output voltage VO.

Referring to FIG. 13B, in one embodiment, the reference voltage VREF2 is a signal related to the voltage threshold VTH. In one embodiment, the level of the reference voltage VREF2 can be, for example but not limited to, equal to the level of the voltage threshold VTH. In another embodiment, the level of the reference voltage VREF2 can be, for example but not limited to, positively correlated to the level of the voltage threshold VTH.

Figure 14A:
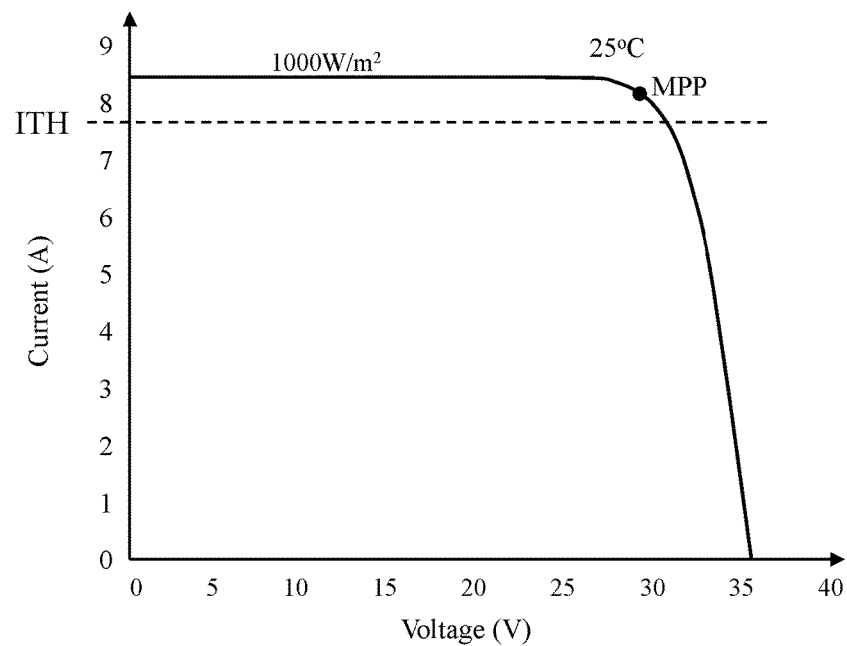
FIG. 14A shows a schematic diagram of a relationship between a current threshold ITH and a maximum power point current where the power conversion apparatus is in normal operation.
Figure 14B:
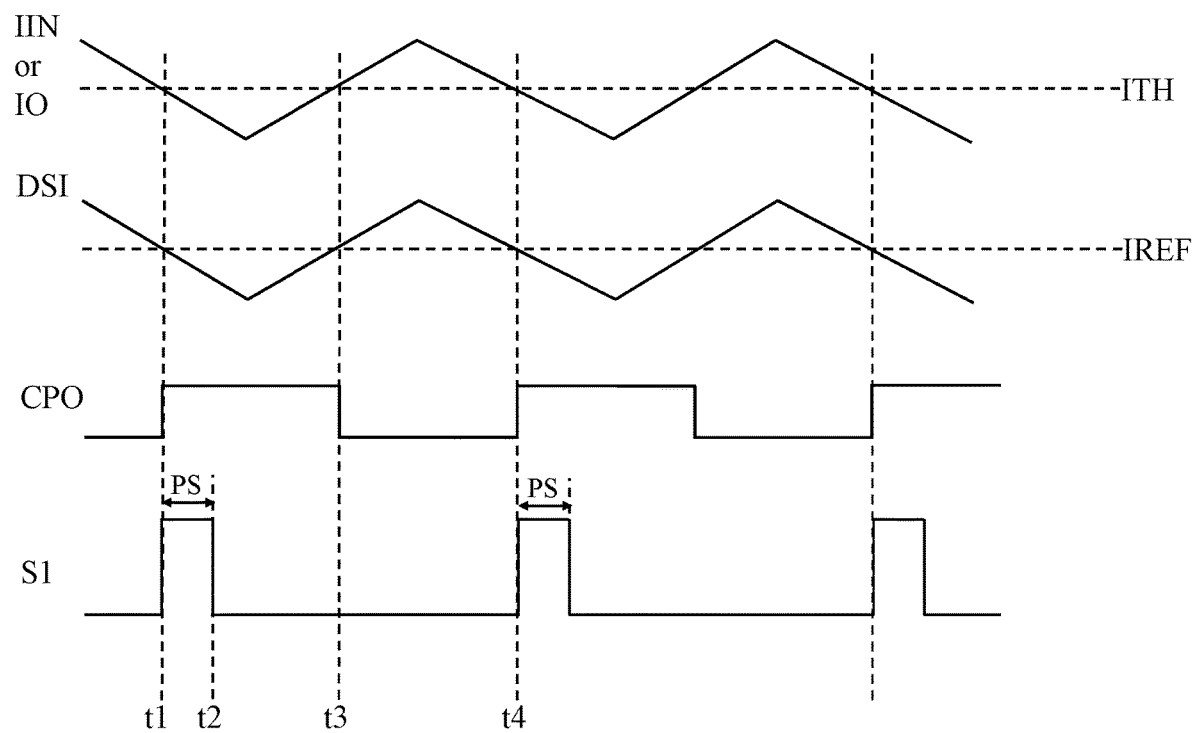
FIG. 14B shows a schematic diagram of signal waveforms of the power conversion apparatus according to another embodiment of the present invention.

Please refer to FIGS. 14A and 14B in conjugation with FIGS. 9 and 10. FIG. 14A shows a schematic diagram of a relationship between a current threshold ITH and a maximum power point current where the power conversion apparatus is in normal operation. FIG. 14B shows a schematic diagram of signal waveforms of the power conversion apparatus according to an embodiment of the present invention.

As shown in FIG. 14B, in one embodiment, when the input current IIN or the output current IO drops to be lower than the current threshold ITH (e.g., as shown by the period from the timing point t1 to the timing point t3 in FIG. 14B) or when the input current related signal DSI or the output current related signal DSI drops to be lower than the reference current IREF (e.g., as shown by the period from the timing point t1 to the timing point t3 in FIG. 14B), the single pulse generation circuit 26 generates the single pulse signal S1 according to the control signal CPO, so that the transistor switch M is turned ON by the single pulse signal S1 for the single pulse period PS (e.g., as shown by the period from the timing point t1 to the timing point t2 in FIG. 14B), thereby discharging the sensing capacitor CS; accordingly, the level of the control signal VA is raised up. Under such circumstance, since the level of the control signal VA has been raised up, in one embodiment, when the level of the control signal VA is raised up to exceed the reference voltage VREF1, the comparison circuit 30 can generate the adjusted control signal VCT according to the difference between the raised sensing signal VA and the reference voltage VREF1. Thus, the power conversion apparatus 510 can control the converter circuit 40 via the adjusted control signal VCT, to raise up the output voltage VO and/or the output current IO of the output power according to the adjusted control signal VCT, so that the photovoltaic battery 101 can operate substantially near the maximum power point (MMP).

It is worthwhile noting that, in one embodiment, as shown in FIG. 14A, the current threshold ITH can be set to be greater than the MPP current where the power conversion apparatus is in normal operation.

Referring to FIG. 14B, in one embodiment, the level of the input current related signal DSI can be, for example but not limited to, equal to the level of the input current IIN, and the level of the output current related signal DSI can be, for example but not limited to, equal to the level of the output current IO. In another embodiment, the level of the input current related signal DSI can be, for example but not limited to, positively correlated to the level of the input current IIN, and the level of the output current related signal DSI can be, for example but not limited to, positively correlated to the level of the output current IO.

Referring to FIG. 14B, in one embodiment, the reference current IREF is a signal related to the current threshold ITH. In one embodiment, the level of the reference current IREF can be, for example but not limited to, equal to the level of the current threshold ITH. In another embodiment, the level of the reference current IREF can be, for example but not limited to, positively correlated to the level of the current threshold ITH.

Figure 15:
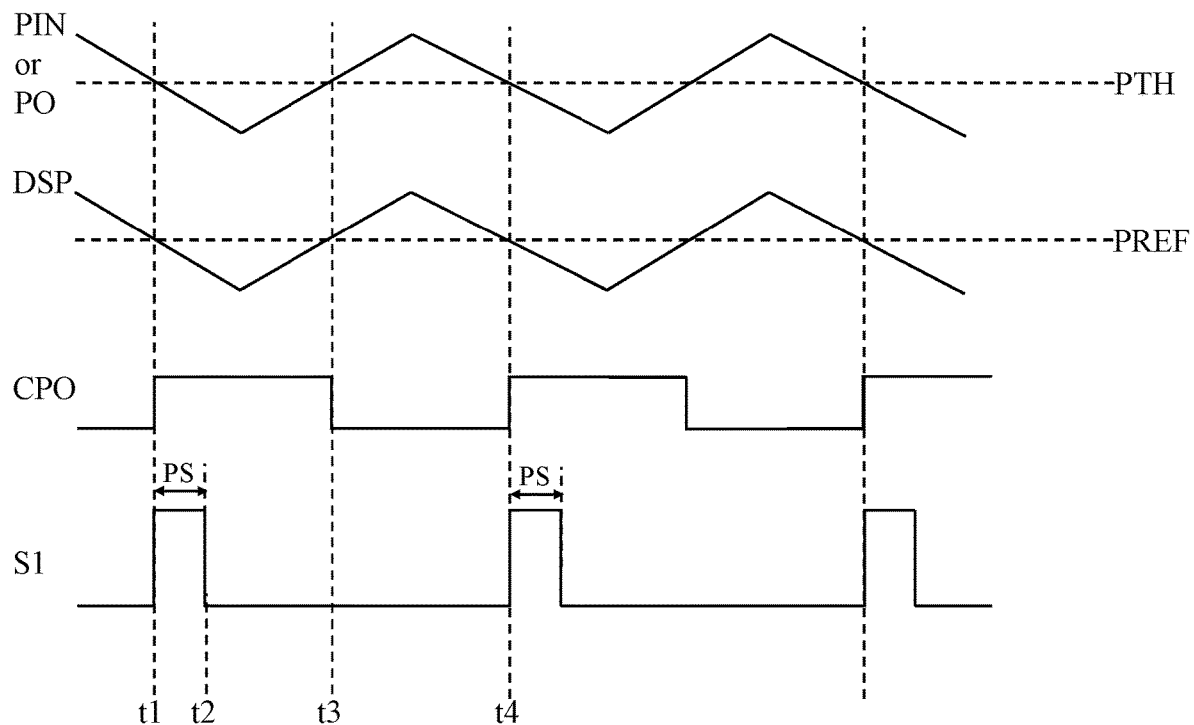
FIG. 15 shows a schematic diagram of signal waveforms of the power conversion apparatus according to yet another embodiment of the present invention.

Please refer to FIG. 15 in conjugation with FIGS. 9 and 10. FIG. 15 shows a schematic diagram of signal waveforms of the power conversion apparatus according to an embodiment of the present invention.

As shown in FIG. 15, in one embodiment, when the power PIN of the input power or the power PO of the output power drops to be lower than the power threshold PTH (e.g., as shown by the period from the timing point t1 to the timing point t3 in FIG. 15) or when the power related signal DSP of the power PIN of the input power or the power related signal DSP of the power PO of the output power drops to be lower than the reference power PREF (e.g., as shown by the period from the timing point t1 to the timing point t3 in FIG. 15), the single pulse generation circuit 26 generates the single pulse signal S1 according to the control signal CPO, so that the transistor switch M is turned ON by the single pulse signal S1 for the single pulse period PS (e.g., as shown by the period from the timing point t1 to the timing point t2 in FIG. 15), thereby discharging the sensing capacitor CS; accordingly, the level of the control signal VA is raised up. Under such circumstance, since the level of the control signal VA has been raised up, in one embodiment, when the level of the control signal VA is raised up to exceed the comparison circuit 30 can generate the adjusted control signal VCT according to the difference between the raised sensing signal VA and the reference voltage VREF1. Thus, the power conversion apparatus 510 can control the converter circuit 40 via the adjusted control signal VCT, to raise up the output voltage VO and/or the output current IO of the output power according to the adjusted control signal VCT, so that the photovoltaic battery 101 can operate substantially near the maximum power point (MMP).

Referring to FIG. 15, in one embodiment, the level of the power related signal DSP of the power PIN of the input power can be, for example but not limited to, equal to the level of the power PIN of the input power, and the level of the power related signal DSP of the power PO of the output power can be, for example but not limited to, equal to the level of the power PO of the output power. In another embodiment, the level of the power related signal DSP of the power PIN of the input power can be, for example but not limited to, positively correlated to the level of the power PIN of the input power, and the level of the power related signal DSP of the power PO of the output power can be, for example but not limited to, positively correlated to the level of the power PO of the output power.

Referring to FIG. 15, in one embodiment, the reference power PREF is a signal related to the power threshold PTH. In one embodiment, the level of the reference power PREF can be, for example but not limited to, equal to the level of the power threshold PTH. In another embodiment, the level of the reference power PREF can be, for example but not limited to, positively correlated to the level of the power threshold PTH.

It is noteworthy that, via the loop operation by the above-mentioned bias sensing circuit 21, clamp circuit 22, comparison circuit 30, comparison circuit 35 and converter circuit 40, the power conversion apparatus of the present invention can automatically track the MPP of the photovoltaic battery 101 and operate near the MPP. In other words, the power conversion apparatus of the present invention can control the bias sensing circuit 21 via the control signal CPO generated by the comparison circuit 35, to adjust the sensing signal VA, to thereby adjust the control signal VCT generated by the comparison circuit 30. Thus, the power conversion apparatus of the present invention can control the converter circuit 40 via an adjusted control signal VCT, such that the converter circuit 40 can adjust the output voltage VO and/or the output current IO of the output power according to the adjusted control signal VCT, so that the photovoltaic battery 101 can operate substantially near the maximum power point (MMP).

Figure 17:
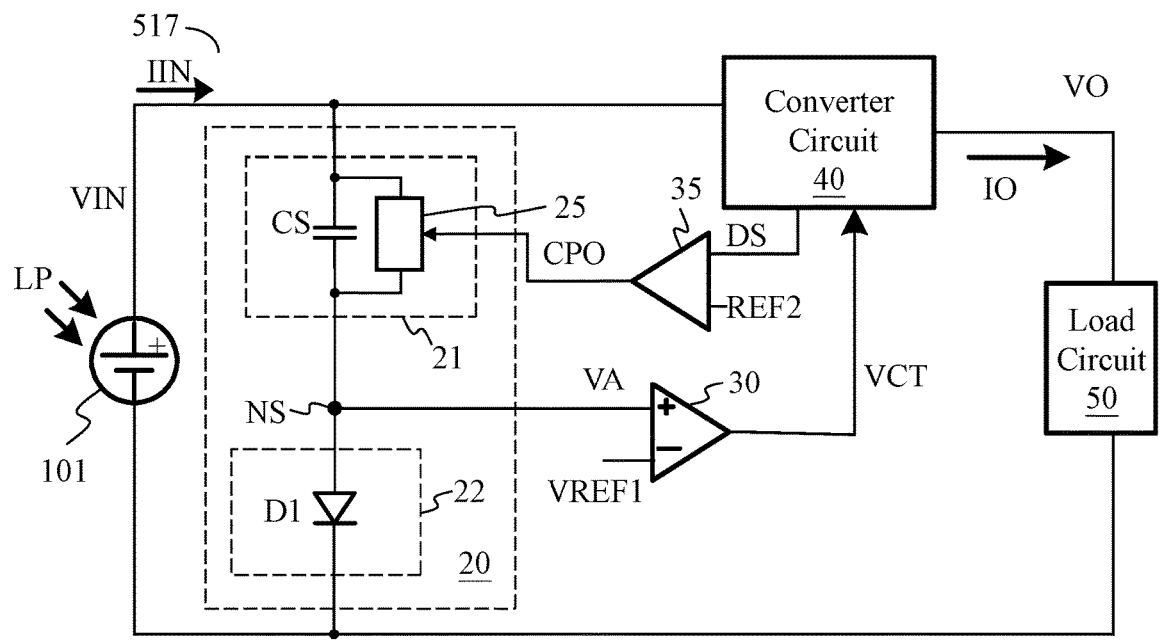
FIG. 17 shows an embodiment of a clamp circuit 22 of the present invention.

Please refer to FIG. 17, which shows an embodiment of a clamp circuit 22 of the present invention. In this embodiment, the clamp circuit 22 for example includes a diode D1. The clamp voltage VCP is related to the forward bias voltage of the diode D1. In another embodiment, the clamp circuit 22 for example can include plural diodes, such as a diode group consisting of diodes connected in series. Under such situation, the clamp voltage VCP is related to a sum of the forward bias voltages of the diode group.

Figure 18:
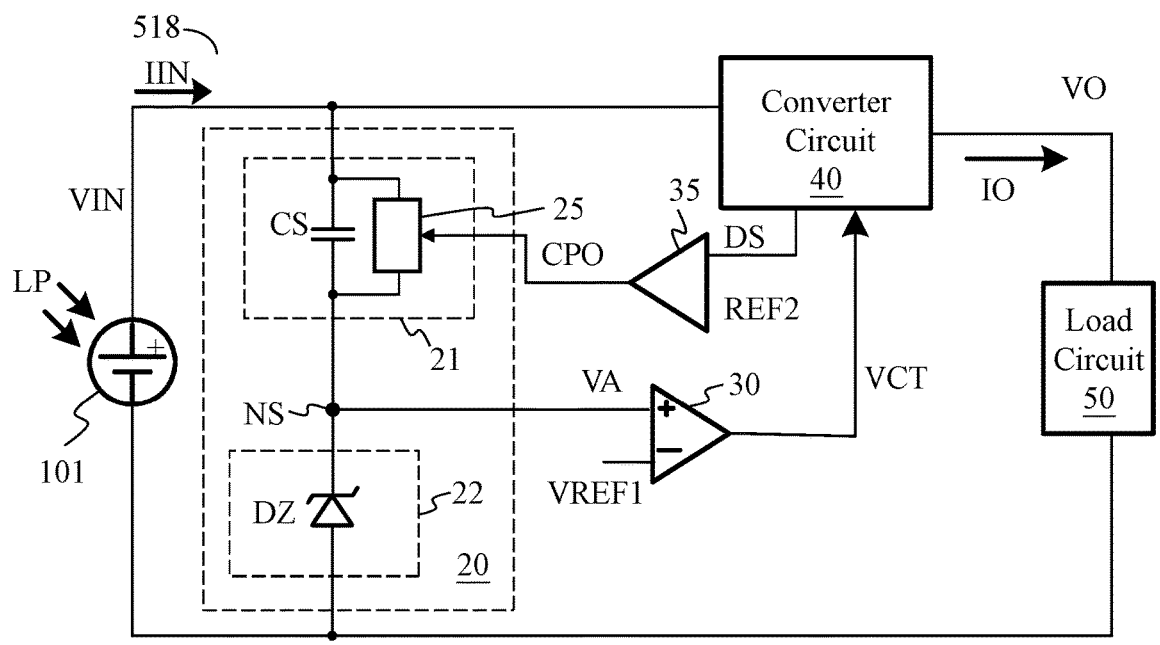
FIG. 18 shows another embodiment of a clamp circuit 22 of the present invention.

Please refer to FIG. 18, which shows another embodiment of the clamp circuit 22 of the present invention. In this embodiment, the clamp circuit 22 for example can include a Zener diode DZ, wherein the clamp voltage VCP is related to the Zener voltage of the Zener diode DZ.

Figure 19:
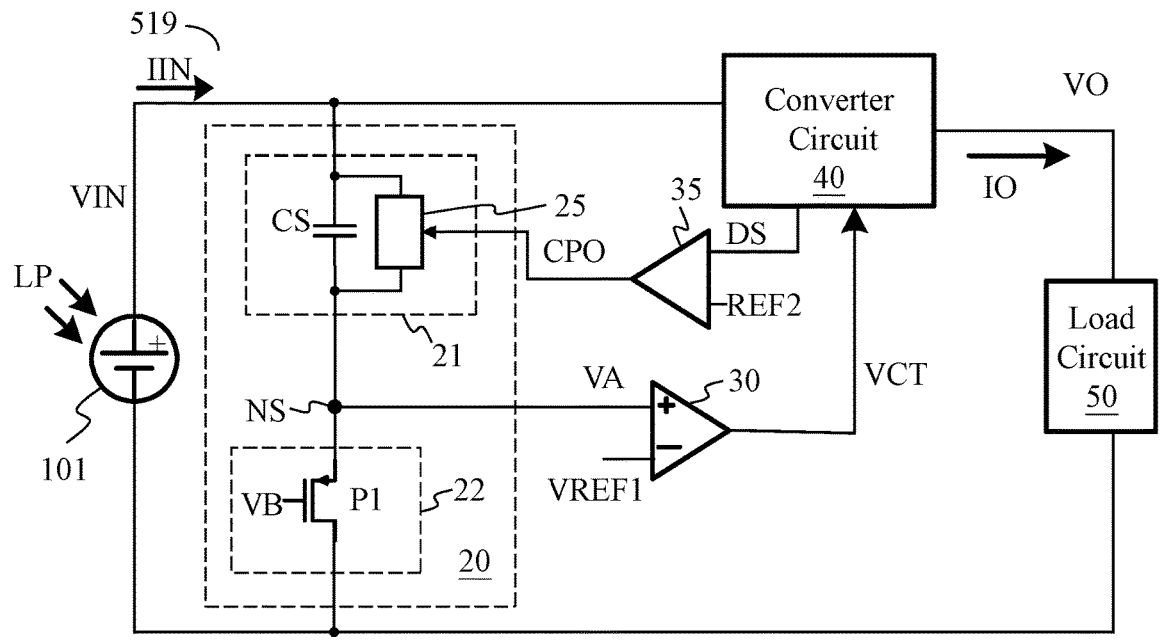
FIGS. 19-20 show two other embodiments of the clamp circuit 22 of the present invention.
Figure 20:
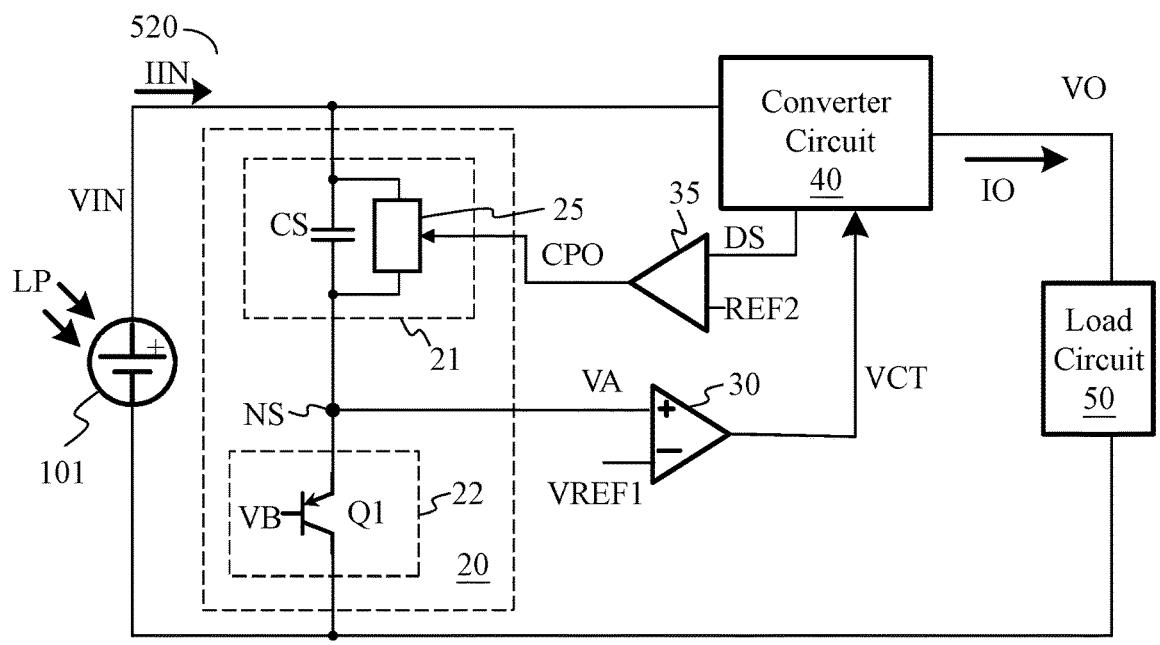

Please refer to FIGS. 19-20, which show two other embodiments of the clamp circuit 22 of the present invention. As shown in FIGS. 19-20, the clamp circuit 22 for example can include a transistor (as shown by P1 in FIG. 19 or as shown by Q1 in FIG. 20) having a control terminal coupled to a bias voltage VB and having a same-phase voltage input end coupled to the sensing node NS. The clamp voltage VCP is related to the bias voltage VB and the ON-threshold voltage of the transistor.

In one embodiment, the transistor P1 can be, for example but not limited to, a PMOS transistor (as shown in FIG. 19). In another embodiment, the transistor Q1 can be, for example but not limited to, a PNP BJT transistor (as shown in FIG. 20). In the present invention, the term "same-phase voltage input end" refers to an input end of a transistor which has a same-phase change as the control terminal of the transistor, which is a source of the PMOS transistor P1 in FIG. 19, or an emitter of the PNP BJT transistor Q1 in FIG. 20.

Figure 21:
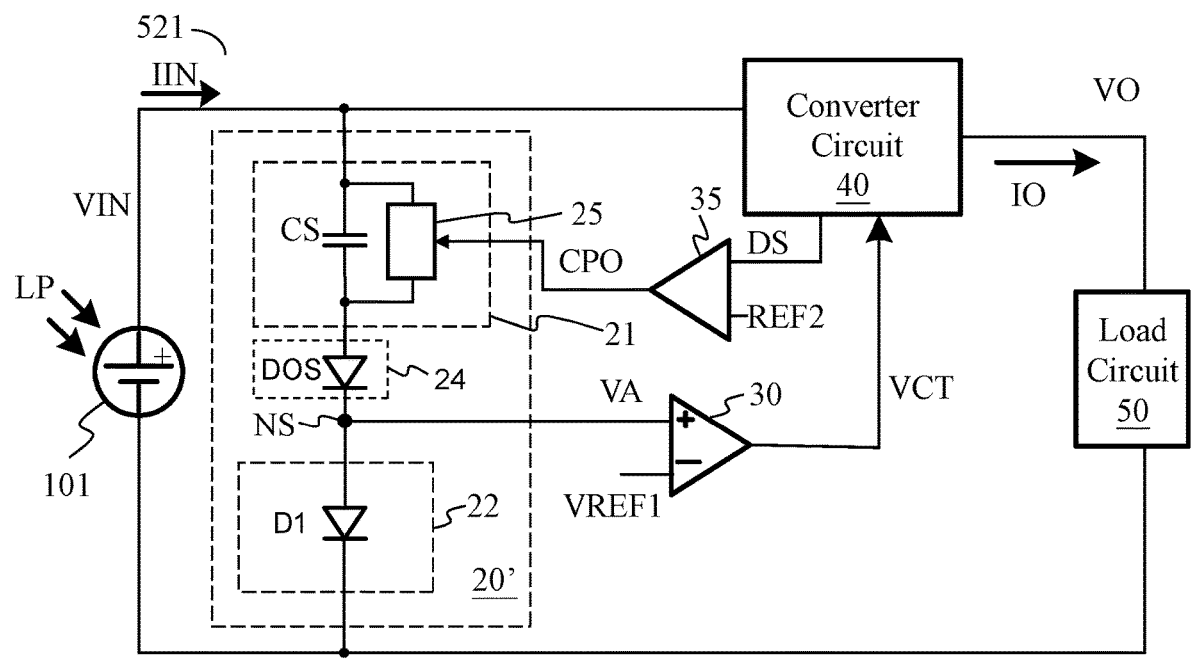
FIG. 21 shows an embodiment of a signal processing circuit 20' of the present invention.

Please refer to FIG. 21, which shows another embodiment of a signal processing circuit of the present invention (i.e., signal processing circuit 20'). In this embodiment, the signal processing circuit 20' further includes an offset device 24. The offset device 24 and the bias sensing circuit 21 are connected in series between the input power and the sensing node NS. The offset device 24 is configured to operably provide an offset voltage, so as to generate the sensing signal VA. The location of offset device 24 with respect to the bias sensing circuit 21 is not limited to be as shown in the figure. For example, the location of the offset device 24 and the location of the bias sensing circuit 21 can be interchanged, that is, the offset device 24 can be directly coupled to the input voltage VIN. In one embodiment, as shown in FIG. 21, the offset device 24 includes an offset diode DOS. In this embodiment, the offset voltage is related to the forward bias voltage of the offset diode DOS.

As mentioned above, the MPP of the photovoltaic battery 101 (or any other type of power retrieval source) varies in accordance with changes in temperatures. According to the present invention, in one embodiment, the photovoltaic battery 101 (or any other type of power retrieval source) and the clamp circuit 22 include semiconductor junctions of the same characteristics, such that the variation of the clamp voltage VCP and the variation of the input voltage VIN with respect to a temperature change are positively correlated to each other. For example, in one embodiment, both of the photovoltaic battery 101 and the clamp circuit 22 (e.g., diode D1) include a P-N semiconductor junction, so that the variations of the clamp voltage VCP and the input voltage VIN with respect to a temperature change are positively correlated to each other.

The present invention has been described in considerable detail with reference to certain preferred embodiments thereof. It should be understood that the description is for illustrative purpose, not for limiting the scope of the present invention. An embodiment or a claim of the present invention does not need to achieve all the objectives or advantages of the present invention. The title and abstract are provided for assisting searches but not for limiting the scope of the present invention. Those skilled in this art can readily conceive variations and modifications within the spirit of the present invention. For example, the clamp device can be a combination of two or more of the above-mentioned diode, Zener diode and transistor. Under such circumstance, the clamp voltage will be a sum of parameters of the respective devices (forward bias voltage, Zener voltage and/or ON-threshold voltage). For another example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. It is not limited for each of the embodiments described herein before to be used alone; under the spirit of the present invention, two or more of the embodiments described hereinbefore can be used in combination. For example, two or more of the embodiments can be used together, or, a part of one embodiment can be used to replace a corresponding part of another embodiment. In view of the foregoing, the spirit of the present invention should cover all such and other modifications and variations, which should be interpreted to fall within the scope of the following claims and their equivalents.

What is claimed is:

1. A power conversion apparatus for tracking maximum power point, which is configured to receive an input power supplied by a power retrieval source, the power conversion apparatus comprising:
   a signal processing circuit coupled to the input power, wherein the signal processing circuit is configured to operably generate a first sensing signal at a sensing node;
   a first comparison circuit, which is configured to operably generate a first control signal according to a difference between the first sensing signal and a first reference voltage;

a converter circuit, which is configured to operably convert the input power to an output power according to the first control signal, so as to supply the output power to a load circuit; and a second comparison circuit, which is configured to operably sense a second sensing signal generated by the converter circuit, the second comparison circuit being configured to operably generate a second control signal according to a difference between the second sensing signal and a reference signal, wherein the second sensing signal includes one of the following or a combination thereof:

an input voltage related signal of the input power;
an output voltage related signal of the output power;
an input current related signal of the input power;
an output current related signal of the output power;
a power related signal of the input power; and/or
a power related signal of the output power;
wherein the signal processing circuit includes:
  a bias sensing circuit coupled between the input power and the sensing node, wherein the bias sensing circuit is configured to operably generate the first sensing signal at the sensing node according to the input voltage; and
  a clamp circuit coupled to the sensing node, wherein the clamp circuit is configured to operably clamp the first sensing signal, so that the first sensing signal is not greater than a clamp voltage;
wherein the bias sensing circuit is configured to operably adjust the first sensing signal according to the second control signal, so as to adjust the first control signal;
whereby, the converter circuit adjusts the output voltage and/or the output current of the output power according to the adjusted first control signal, so that the power retrieval source operates near a maximum power point.

2. The power conversion apparatus of claim 1, wherein the bias sensing circuit includes:
  a sensing capacitor coupled between the input power and the sensing node; and
  a discharge device, which is configured to operably control whether the sensing capacitor is discharged according to the second control signal, so as to adjust a level of the first sensing signal;
  wherein the sensing capacitor and the discharge device are connected in parallel between the input power and the sensing node.

3. The power conversion apparatus of claim 2, wherein the discharge device includes one of the following or a combination thereof:
  a transistor switch, wherein the second control signal controls a control terminal of the transistor switch, to thereby control whether the sensing capacitor is discharged;
  a transistor switch and a single pulse generation circuit, wherein the single pulse generation circuit is coupled between the second comparison circuit and the transistor switch, the single pulse generation circuit being configured to operably generate a single pulse signal according to the second control signal,
  wherein the single pulse signal controls a control terminal of the transistor switch, to turn ON the transistor switch for a single pulse period of the single pulse signal, thereby discharging the sensing capacitor;
  a transistor switch and a resistor,
  wherein the second control signal controls a control terminal of the transistor switch, to thereby control whether the sensing capacitor is discharged; and/or
  a transistor switch, a single pulse generation circuit and a resistor,
  wherein the single pulse generation circuit is coupled between the second comparison circuit and the transistor switch, the single pulse generation circuit being configured to operably generate a single pulse signal according to the second control signal,
  wherein the single pulse signal controls a control terminal of the transistor switch, to turn ON the transistor switch for a single pulse period of the single pulse signal, thereby discharging the sensing capacitor.

4. The power conversion apparatus of claim 2, wherein the discharge device at least includes a transistor switch and a single pulse generation circuit, and wherein when the input voltage or the output voltage rises to be higher than a voltage threshold or when the input voltage related signal or the output voltage related signal rises to be higher than a second reference voltage, the single pulse generation circuit generates the single pulse signal according to the second control signal, so that the transistor switch is turned ON by the single pulse signal, thereby discharging the sensing capacitor to adjust the level of the first control signal, so that the power retrieval source operates near the maximum power point;
  wherein the second reference voltage is a signal related to the voltage threshold.

5. The power conversion apparatus of claim 2, wherein the discharge device at least includes a transistor switch and a single pulse generation circuit, and wherein when the input current or the output current drops to be lower than a current threshold or when the input current related signal or the output current related signal drops to be lower than a reference current, the single pulse generation circuit generates the single pulse signal according to the second control signal, so that the transistor switch is turned ON by the single pulse signal, thereby discharging the sensing capacitor to adjust the level of the first control signal, so that the power retrieval source operates near the maximum power point;
  wherein the reference current is a signal related to the current threshold.

6. The power conversion apparatus of claim 2, wherein the discharge device at least includes a transistor switch and a single pulse generation circuit, and wherein when a power of the input power or a power of the output power drops to be lower than a power threshold or when the power related signal of the input power or the power related signal of the output power drops to be lower than a reference power, the single pulse generation circuit generates the single pulse signal according to the second control signal, so that the transistor switch is turned ON by the single pulse signal, thereby discharging the sensing capacitor to adjust the level of the first control signal, so that the power retrieval source operates near the maximum power point;
  wherein the reference power is a signal related to the power threshold.

7. The power conversion apparatus of claim 1, wherein when the first sensing signal exceeds the first reference voltage, the converter circuit raises up the output voltage and/or the output current; and wherein when the first sensing signal does not exceed the first reference voltage, the converter circuit lowers down the output voltage and/or the output current, so that the power retrieval source operates near the maximum power point.

8. The power conversion apparatus of claim 4, wherein the voltage threshold is greater than a maximum power point voltage where the power conversion apparatus is in normal operation.

9. The power conversion apparatus of claim 5, wherein the current threshold is smaller than a maximum power point current where the power conversion apparatus is in normal operation.

10. The power conversion apparatus of claim 1, wherein the clamp voltage is greater than the first reference voltage.

11. The power conversion apparatus of claim 10, wherein the first reference voltage is any value between the clamp voltage and zero.

12. The power conversion apparatus of claim 10, wherein the first reference voltage is not correlated to an operation parameter of the power retrieval source.

13. The power conversion apparatus of claim 1, wherein the clamp circuit includes one of the following or a combination thereof:
   a diode, wherein the clamp voltage is related to a forward bias voltage of the diode;
   a Zener diode, wherein the clamp voltage is related to a Zener voltage of the Zener diode; and/or
   a transistor having a control terminal coupled to a bias voltage and having a same-phase voltage input end coupled to the sensing node, wherein the clamp voltage is related to the bias voltage and an ON-threshold voltage of the transistor.

14. The power conversion apparatus of claim 2, wherein the signal processing circuit further includes:
   an offset device, wherein the offset device and the bias sensing circuit are connected in series between the input power and the sensing node, the offset device being configured to operably supply an offset voltage, so as to generate the first sensing signal.

15. The power conversion apparatus of claim 14, wherein the offset device includes an offset diode, and the offset voltage is related to a forward bias voltage of the offset diode.

16. The power conversion apparatus of claim 1, wherein the converter circuit includes a power calculation circuit, the power calculation circuit being configured to operably obtain a power of the input power according to the input voltage and the input current or the power calculation circuit being configured to operably obtain a power of the output power according to the output voltage and the output current.

17. The power conversion apparatus of claim 2, wherein:
   when the input voltage increases whereby the clamp circuit starts to function and the clamp circuit clamps the first sensing signal at the clamp voltage, the sensing capacitor samples a voltage difference between the input voltage and the clamp voltage; and
   when the input voltage decreases whereby the clamp circuit does not function, the sensing capacitor holds the voltage difference such that the first sensing signal is lower than the clamp voltage and the sensing signal is positively correlated with the input voltage.

18. The power conversion apparatus of claim 1, wherein the power retrieval source includes a photovoltaic battery, which is configured to operably retrieve a solar power to supply the input power.

19. The power conversion apparatus of claim 1, wherein the power retrieval source and the clamp circuit include semiconductor junctions of same characteristics, such that a variation of the clamp voltage and a variation of the input voltage with respect to a temperature change are positively correlated to each other.

20. A control method for a power conversion apparatus for tracking maximum power point, wherein the power conversion apparatus is configured to receive an input power supplied by a power retrieval source, and the power conversion apparatus includes a converter circuit; the control method comprising:
   generating a first sensing signal at a sensing node;
   generating a first control signal according to a difference between the first sensing signal and a first reference voltage;
   controlling the converter circuit according to the first control signal, to convert the input power to an output power and to supply the output power to a load circuit;
   sensing a second sensing signal generated by the converter circuit and generating a second control signal according to a difference between the second sensing signal and a reference signal, wherein the second sensing signal includes one of the following or a combination thereof:
   an input voltage related signal of the input power;
   an output voltage related signal of the output power;
   an input current related signal of the input power;
   an output current related signal of the output power;
   a power related signal of the input power; and/or
   a power related signal of the output power;
   clamping the first sensing signal such that the first sensing signal is not greater than a clamp voltage;
   adjusting the first sensing signal according to the second control signal, so as to adjust the first control signal;
   whereby, the converter circuit adjusts the output voltage and/or the output current of the output power according to the adjusted first control signal, so that the power retrieval source operates near a maximum power point.

21. The control method of claim 20, wherein the step for adjusting the first sensing signal includes:
   controlling whether a sensing capacitor is discharged according to the second control signal via a discharge device, so as to adjust a level of the first sensing signal;
   wherein the sensing capacitor and the discharge device are connected in parallel between the input power and the sensing node.

22. The control method of claim 21, wherein the discharge device includes one of the following or a combination thereof:
   a transistor switch;
   a transistor switch and a single pulse generation circuit;
   a transistor switch and a resistor; and/or
   a transistor switch, a single pulse generation circuit and a resistor.

23. The control method of claim 21, wherein the discharge device at least includes a transistor switch and a single pulse generation circuit, and wherein the step for adjusting the level of the first sensing signal further includes:
   when the input voltage or the output voltage rises to be higher than a voltage threshold or when the input voltage related signal or the output voltage related signal rises to be higher than a second reference voltage, the single pulse generation circuit generates the single pulse signal according to the second control signal, so that the transistor switch is turned ON by the single pulse signal, thereby discharging the sensing capacitor to adjust the level of the first control signal, so that the power retrieval source operates near the maximum power point;

wherein the second reference voltage is a signal related to the voltage threshold.

24. The control method of claim 21, wherein the discharge device at least includes a transistor switch and a single pulse generation circuit, and wherein the step for adjusting the level of the first sensing signal further includes:
when the input current or the output current drops to be lower than a current threshold or when the input current related signal or the output current related signal drops to be lower than a reference current, the single pulse generation circuit generates the single pulse signal according to the second control signal, so that the transistor switch is turned ON by the single pulse signal, thereby discharging the sensing capacitor to adjust the level of the first control signal, so that the power retrieval source operates near the maximum power point;
wherein the reference current is a signal related to the current threshold.

25. The control method of claim 21, wherein the discharge device at least includes a transistor switch and a single pulse generation circuit, and wherein the step for adjusting the level of the first sensing signal further includes:
when a power of the input power or a power of the output power drops to be lower than a power threshold or when the power related signal of the input power or the power related signal of the output power drops to be lower than a reference power, the single pulse generation circuit generates the single pulse signal according to the second control signal, so that the transistor switch is turned ON by the single pulse signal, thereby discharging the sensing capacitor to adjust the level of the first control signal, the level of the first control signal is accordingly adjusted, so that the power retrieval source operates near the maximum power point;
wherein the reference power is a signal related to the power threshold.

26. The control method of claim 20, wherein the first sensing signal is clamped by one of the following or a combination thereof:
a diode, wherein the clamp voltage is related to a forward bias voltage of the diode;
a Zener diode, wherein the clamp voltage is related to a Zener voltage of the Zener diode; and/or
a transistor having a control terminal coupled to a bias voltage and having a same-phase voltage input end coupled to the sensing node, wherein the clamp voltage is related to the bias voltage and an ON-threshold voltage of the transistor.

* * * * *